(12) United States Patent
Kuribayashi et al.

(10) Patent No.: US 7,127,459 B2
(45) Date of Patent: Oct. 24, 2006

(54) COMPONENT ELECTRONIC CATALOG

(75) Inventors: Takeshi Kuribayashi, Yamanashi (JP);
Yasuhiro Maenishi, Yamanashi (JP);
Hiroyoshi Nishida, Yamanashi (JP);
Nobuyuki Nakamura, Saitama (JP);
Satoshi Masuda, Osaka (JP); Atsushi Tanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 10/255,953

(22) Filed: Sep. 27, 2002

(65) Prior Publication Data

US 2003/0078676 A1    Apr. 24, 2003

Related U.S. Application Data

(60) Continuation-in-part of application No. 09/927,376, filed on Aug. 13, 2001, now Pat. No. 6,480,846, which is a division of application No. 09/117,273, filed as application No. PCT/JP97/00140 on Jan. 23, 1997, now Pat. No. 6,334,115.

(30) Foreign Application Priority Data

Jan. 26, 1996   (JP)   ..................... 8-12132

(51) Int. Cl.
G06F 17/30   (2006.01)

(52) U.S. Cl. .............. 707/6; 707/1; 707/100; 700/1; 700/95

(58) Field of Classification Search .......... 700/95; 707/103, 501, 6, 100–104, 3, 204
See application file for complete search history.

(56) References Cited

U.S. PATENT DOCUMENTS 5,142,662 A    8/1992   Gump et al. ............ 715/501.1

(Continued)

FOREIGN PATENT DOCUMENTS

DE       3911465 A1    10/1990

(Continued)

OTHER PUBLICATIONS

Proceedings of the Design Automation Conference, Las Vegas, Jun. 25-29, 1989, No. Conf. 26, Jun. 25, 1999, Institute of Electrical and Electronics Engineers, pp. 460-465, XP000145829, A.C. Hung et al.: "MIOS: A Flexible System for PCB Manufacturing", see p. 461, col. 2 line 10—p. 462, col. 1, line 29.

(Continued)

*Primary Examiner*—Charles Rones
*Assistant Examiner*—Belix M. Ortiz
(74) *Attorney, Agent, or Firm*—Wenderoth, Lind & Ponack, L.L.P.

(57) ABSTRACT

Image data of various kinds of components and component text data required for mounting of components, e.g., shapes, dimensions, packing forms, colors, and the like of the components, are stored in a storage medium in a manner to be read out as part of a component electronic catalog. The storage medium is used to make a search for components on a screen and automatically read out necessary component text data. The component electronic catalog can be used not only to search for components on a screen, similar to a conventional component electronic catalog, but to automatically read out component text data so as to automatically form mounting data for components to be mounted which are selected through the screen search.

2 Claims, 37 Drawing Sheets

U.S. PATENT DOCUMENTS

| | | | |
|---|---|---|---|
| 5,165,015 A | 11/1992 | Coggins | 345/356 |
| 5,272,641 A | 12/1993 | Ford et al. | 700/97 |
| 5,293,479 A | 3/1994 | Quintero et al. | 715/841 |
| 5,694,546 A | 12/1997 | Reisman | 705/26 |
| 5,721,832 A | 2/1998 | Westrope et al. | 705/27 |
| 5,777,876 A | 7/1998 | Beauchesne | 700/95 |
| 5,897,639 A | 4/1999 | Greef et al. | 707/103 R |
| 5,907,489 A | 5/1999 | Elliott | 700/97 |
| 6,002,650 A | 12/1999 | Kuribayashi et al. | 700/117 |

FOREIGN PATENT DOCUMENTS

| | | |
|---|---|---|
| JP | 62-247466 A | 10/1987 |
| JP | 5-225292 | 9/1993 |
| JP | 6-41805 | 2/1994 |
| JP | 09-018199 A | 1/1997 |

OTHER PUBLICATIONS

CD Computing News, vol. 5, No. 4, p. N/A, "Reference Technology Introduces Parts Book Application Package".

Patent Abstracts of Japan, vol. 17, No. 677 (p-1659), Dec. 13, 1993 & JP 05 225292 A (Matsushita Electric Ind Co., Ltd.), Sep. 3, 1993, see abstract.

Printed Circuit Design, vol. 12, No. 10, Oct. 1995, US, pp. 17-19, XP000672813, Clark: "EDIF Technical Center", see p. 18, col. 1, line 44—col. 2, line 9.

Elektronik, vol. 43, No. 20, Oct. 4, 1994, pp. 92-94, 96-98, XP000445340 Kroll J: "Finden Statt Suchen Multimedia-Datenbank Fur Elektronische Bauteile: Der Katalog Auf DC Feiert Premiere", see the whole document.

Fig.2

| | Component id (new) | : | Component id (origin) | : | Cno. | : | Pnt-X: | Pnt-Y: | Angle: | Form |
|---|---|---|---|---|---|---|---|---|---|---|
| 1 | Component id (new) | : | Component id (origin) | : | Cno. | : | Pnt-X: | Pnt-Y: | Angle: | Form |
| 2 | #PC00001 | : | #PC00001 | : | 191: | | 320.000: | 5.000: | 0.000: | Flg |
| 3 | #PC00002 | : | #PC00002 | : | 192: | | 5.000: | 5.000: | 0.000: | Flg |
| 4 | #PC00003 | : | #PC00003 | : | 198: | | 3.750: | 186.500: | 0.000: | Flg |
| 5 | #PC00004 | : | #PC00004 | : | 199: | | 321.250: | 186.500: | 0.000: | Flg |
| 6 | #PC00005 | : | #PC00005 | : | 15000: | | 319.000: | 10.000: | 90.000: | Flg |
| 7 | #PC00006 | : | #PC00006 | : | 15000: | | 6.000: | 180.000: | 90.000: | Flg |
| 8 | #PC00127 | : | #PC00127 | : | 32: | | 100.000: | 182.000: | 0.000: | Flg |
| 9 | #PC00128 | : | #PC00128 | : | 563: | | 13.000: | 185.000: | 0.000: | Flg |
| 10 | #PC00132 | : | #PC00132 | : | 563: | | 101.000: | 75.000: | 90.000: | Flg |
| 11 | #PC00133 | : | #PC00133 | : | 35: | | 13.000: | 75.000: | 0.000: | Flg |
| 12 | #PC00137 | : | #PC00137 | : | 15003: | | 61.500: | 79.500: | 180.000: | SMD C |
| 13 | #PC00138 | : | #PC00138 | : | 15013: | | 39.500: | 149.000: | 0.000: | SMD C |
| 14 | #PC00139 | : | #PC00139 | : | 915: | | 56.000: | 91.000: | 90.000: | DIP |
| 15 | #PC00140 | : | #PC00140 | : | 910: | | 62.500: | 136.000: | 90.000: | DIP |
| 16 | #PC00141 | : | #PC00141 | : | 930: | | 32.000: | 131.500: | 0.000: | DIP |
| 17 | #PC00142 | : | #PC00142 | : | 15013: | | 36.000: | 133.500: | 90.000: | SMD C |
| 18 | #PC00143 | : | #PC00143 | : | 923: | | 46.000: | 128.500: | 180.000: | DIP |
| 19 | #PC00256 | : | #PC00256 | : | 15002: | | 67.500: | 34.000: | 90.000: | SMD C |
| 20 | #PC00257 | : | #PC00257 | : | 15002: | | 69.500: | 34.000: | 90.000: | DIP |

Fig.3

```
START-COMPONENT-LIBRARY;
START-HEADER-BLOCK;
MAKER:Matsushita Electronics Corporation;
VERSION:1.01;
CREATE:95/12/15;
START-PACKAGE-SYMBOL;
E=PACKAGE WIDTH;
D=PACKAGE LENGTH;
A=MOUNTING HEIGHT;
A1=STAND-OFF HEIGHT;
A2=MAIN BODY HEIGHT;
e=STRAIGHT INTERVAL OF TERMINALS;
b=TERMINAL WIDTH;
b=TERMINAL ROOT WIDTH;
c=TERMINAL THICKNESS;
x=ALLOWBLE VALUE OF CENTER POSITION OF TERMINAL;
y=UNIFORMITY OF LOWEST SURFACE OF TERMINAL;
θ=ANGLE OF FLAT PART OF TERMINAL;
ZE=PACKAGE OVERHANG;
ZD=PACKAGE OVERHANG;
L=LENGTH OF FLAT PART OF TERMINAL;
L1=TERMINAL LENGTH;
L2=LENGTH OF TAKE-OUT PART OF TERMINAL;
HE=TOTAL WIDTH;
HD=TOTAL LENGTH;
END-PACKAGE-SYMBOL;
START-TAPING-SYMBOL;
W=TAPE WIDTH;
P1=TAPE FEED PITCH;
t=EMBOSS DEPTH
ROTATE=TAPING DIRECTION (ANGLE);
TOTAL=COUNT OF STORED COMPONENTS;
END-TAPING-SYMBOL;
```

Fig.4

[NC PROGRAM]
NC PROGRAM NAME: PPHSCPU4M-R                    COUNT OF REMANING BLOCKS: 1878         COUNT OF REMANING MARK LANDS: 191
                                                        COUNT OF BLOCKS: 122                  COUNT OF MARK LANDS: 9
PROGRAM OFFSET : X=+119.44  Y=+75.68             0.00                                    DATA TYPE:ABSOLUTE

| BLOCK NO. | X COORDINATES | Y COORDINATES | Z NO. | S&R | MOUNTING ANGLE | MOUNTING PROHIBITED | SKIP BLOCK | MARK INSTRUCTION | LAND INSTRUCTION | BAD MARK | MOUNTING HEIGHT |
|---|---|---|---|---|---|---|---|---|---|---|---|
| 1 | +0.00  | +0.00  | 1  | 00 | 0 | 0 | 0 | 2 | 0 | 0 | 0.00 |
| 2 | +63.26 | +25.24 | 15 | 00 | 0 | 0 | 0 | 0 | 0 | 0 | 0.00 |
| 3 | +60.72 | +48.10 | 15 | 00 | 0 | 0 | 0 | 0 | 0 | 0 | 0.00 |
| 4 | +68.34 | +48.10 | 15 | 00 | 0 | 0 | 0 | 0 | 0 | 0 | 0.00 |
| 5 | +56.75 | +25.24 | 15 | 00 | 0 | 0 | 0 | 0 | 0 | 0 | 0.00 |

CIRCUIT NO.[        ]       COMPONENT SHAPE CODE[        ]       COMPONENT NAME CODE[        ]

PROGRAM OFFSET (X) : INPUT RANGE   −1999.99~+1999.99 (mm)

Fig.5

[COMPONENT LIBRARY]
NO.3 COMPONENT SHAPE CODE: S016E

COMPONENT LIBRARY NAME: L1
COMPONENT KIND: 52    TYPE: 0    COLOR: 0

| COMPONENT SIZE | COMPONENT THICKNESS | THICKNESS ALLOWABLE RANGE | MOUNTING NOZZLE SELECTED | HEAD SPEED | CAMERA | RE-SUCTION | SUCTION LEVEL | PRECEDING SUCTION CHECK | LEAD LEVITATION | SUPPLY DETECTION | SUPPLY DIRECTION | SUPPLY FORM | F NUMBER OF TIMES ROTATION | ROTATION |
|---|---|---|---|---|---|---|---|---|---|---|---|---|---|---|
| U 10.45 L 5.35 | | | | | | | | | | | | | | |
| D 10.45 R 5.35 | 1.50 | 0.15 | 3 | 3 | 2 | 2 | 1 | 3 | 0 | 0 | 0 | 3 | 0 | 1 |

| LEAD OUTER SHAPE | LEAD PITCH | LEAD ALLOWANCE | COUNT OF LEADS | LEAD OFFSET | LEVITATION ALLOWANCE | ILLUMI-NATION | ELECTRODE SIZE | | CUT | CUT | CUT | CUT | CUT |
|---|---|---|---|---|---|---|---|---|---|---|---|---|---|
| U | 10.45 | 1.27 | 0.20 | 8 | 0.00 | 0.00 | 1 | LENGTH L  0.00 DIRECTION | 1 | 1 | 2 | 1 | 4 |
| D | | | | 8 | 0.00 | | | WIDTH L  0.00 COUNT | 0 | 0 | 1 | 1 | 1 |
| L | 8.15 | | | 0 | 0.00 | | | LENGTH R  0.00 POSITION | 0 | 0 | 0 | 0 | 0 |
| R | | | | 0 | 0.00 | | | WIDTH R  0.00 | 0 | 0 | 0 | 0 | 0 |

COMPONENT SHAPE CODE: ENGLISH LETTERS AND NUMERALS WITHIN 16

Fig.6

[ARRANGEMENT PROGRAM]
ARRANGEMENT PROGRAM NAME: DPHSCPU4M-R

<DATA EDITION>

COUNT OF CASSETTES: 32  COUNT OF TRAYS: 40

| Z NO. | COMPONENT SHAPE CODE | COMPONENT NAME | COMPONENT SUCTION POSITION X | Y | MASTER Z NO. | SUPPLY CODE | DISCARD | SUCTION HEIGHT |
|---|---|---|---|---|---|---|---|---|
| 8 | | | | | | | | |
| 9 | S016T | ZSWX0003 | +0.00 | +0.00 | 0 | | 1 | 0.0 |
| 10 | | | -116.50 | +0.00 | 0 | | 1 | 0.0 |
| 11 | MELG2 | ZFLB0183 | +0.00 | +0.00 | 0 | | 1 | 0.0 |
| 12 | | | -73.50 | +0.00 | 0 | | 1 | 0.0 |

COMPONENT SHAPE CODE: INPUT RANGE    MAXIMUM 16 LETTERS (WITHOUT INPUT: Z NO. CONCERNED NOT USED)

Fig. 7

SUPPLY POSITION LIBRARY NAME: Y1
SUPPLY CODE: S0J40

COUNT OF SUPPLIES: 100

| FIRST SUCTION POSITION | | FINAL SUCTION POSITION | | TRAY PITCH | | COUNT OF COMPONENTS | | | TAKE-OUT SPEED | COUNT OF EMPTY TRAYS |
|---|---|---|---|---|---|---|---|---|---|---|
| X | Y | X | Y | X | Y | X | Y | TOTAL | | |
| +12.00 | +14.00 | +147.45 | +284.45 | +15.05 | +30.05 | 10 | 10 | 100 | 2 | 0 |

| | 1 | | 2 | | 3 | | 4 | | 5 | | 6 | | 7 | | 8 | | 9 (START) | |
|---|---|---|---|---|---|---|---|---|---|---|---|---|---|---|---|---|---|---|---|
| | X | Y | X | Y | X | Y | X | Y | X | Y | X | Y | X | Y | X | Y | X | Y |
| TRAY EMPTIED POSITION | 0 | 0 | 0 | 0 | 0 | 0 | 0 | 0 | 0 | 0 | 0 | 0 | 0 | 0 | 0 | 0 | 0 | 0 |

SUPPLY CODE: ENGLISH LETTERS AND NUMERALS WITHIN 8

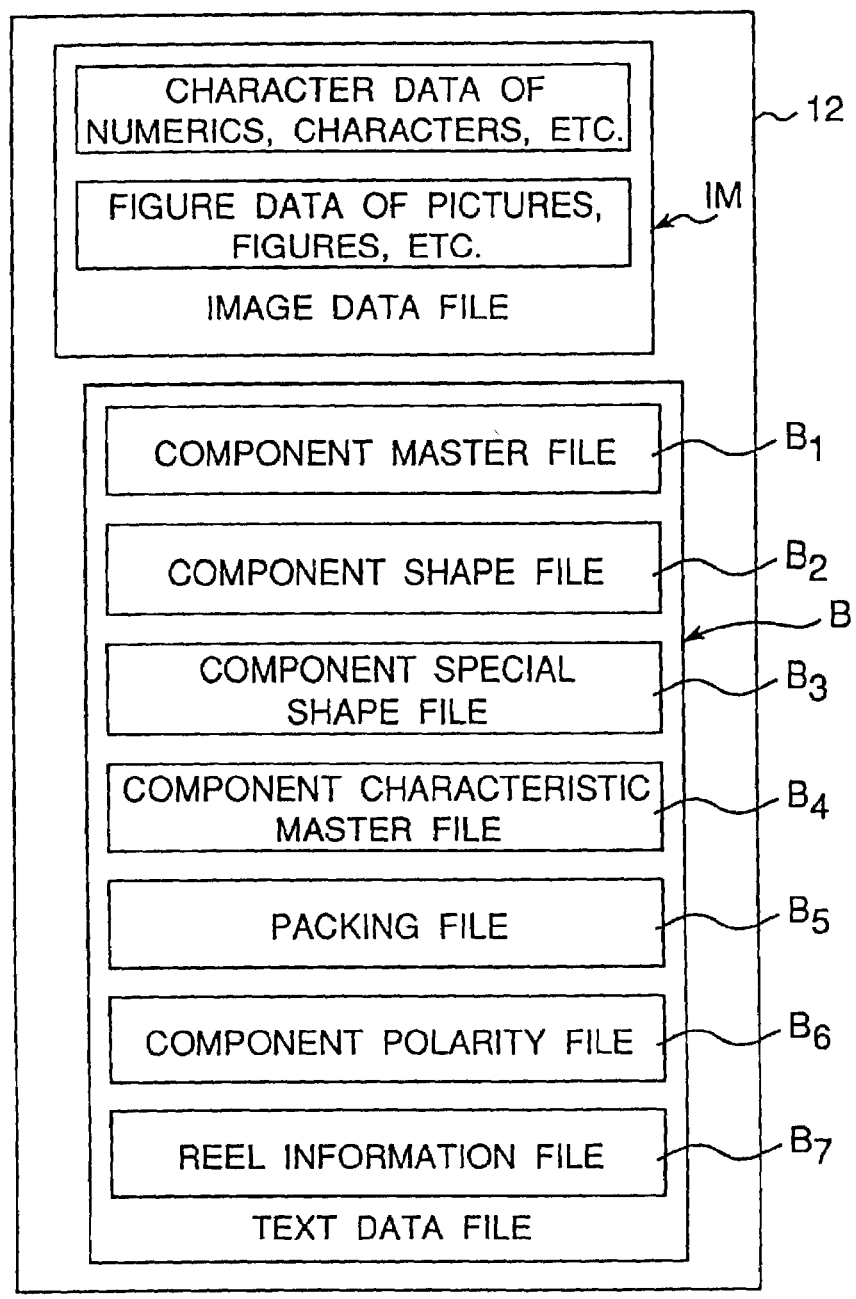
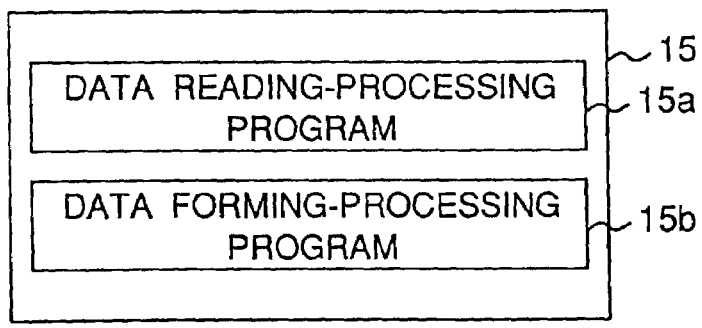

Fig. 25 PRIOR ART

| PRODUCT NAME | PACKAGE CODE | VCEO V | Ic A | Pc W | hFE(min) | hFE(max) |
|---|---|---|---|---|---|---|
| 2SA1018 | TO-92 | −200 | −0.07 | 0.75 | 60 | 220 |
| 2SA1022 | Mini3p | −20 | −0.03 | 0.2 | 70 | 220 |
| 2SA1034 | Mini3p | −35 | −0.05 | 0.2 | 180 | 700 |
| 2SA1035 | Mini3p | −55 | −0.05 | 0.2 | 180 | 700 |
| 2SA1123 | TO-92 | −150 | −0.05 | 0.75 | 130 | 450 |
| 2SA1127 | TO-92 | −55 | −0.1 | 0.4 | 180 | 700 |
| 2SA1128 | TO-92 | −20 | −0.5 | 0.6 | 90 | 220 |
| 2SA1254 | M | −20 | −0.03 | 0.4 | 70 | 220 |
| 2SA1309A | NS | −50 | −0.1 | 0.3 | 160 | 460 |
| 2SA1310 | NS | −55 | −0.1 | 0.3 | 180 | 700 |
| 2SA1323 | | | | | | |

Fig.26  PRIOR ART

| FILE(F) | SEARCH(S) | WINDOW(W) | | | HELP(H) |

| OUTLINE VIEW | LAND VIEW | TAPING SIZE | REEL SIZE |

'92 SMALL SIGNAL TRANSISTORS                                          Panasonik

2SA1022

SILICON PNP EPITAXIAL PLANAR TYPE

HIGH FREQUENCY AMPLIFICATION PURPOSE
2SC2295 AND COMPLIMENTARY

■FEATURE
TRANSITION FREQUENCY fT IS HIGH.
BECAUSE OF MINI PACKAGE, MINIATURIZATION OF DEVICE
AND AUTOMATIC INSERTION BY TAPING OR MAGAZINE PACKAGE ARE POSSIBLE.

■ABSOLUTE MAXIMUM RATING(Ta=25C°) [EXPLANATION OF SYMBOL]

| SYMBOL | RATING | UNIT | REMARKS |
|--------|--------|------|---------|
| VCBO   | −30    | V    |         |
| VCEO   | −20    | V    |         |

COMPONENT ELECTRONIC CATALOG

REFERENCE TO RELATED APPLICATIONS

This is a continuation-in-part application of prior U.S. patent application Ser. No. 09/927,376, filed Aug. 13, 2001 now U.S. Pat. No. 6,480,846, which in turn is a divisional application of prior U.S. patent application Ser. No. 09/117,273, filed Jul. 23, 1998, which is the National Phase of PCT/JP97/00140, filed Jan. 23, 1997, which is now U.S. Pat. No. 6,334,115, issued Dec. 25, 2001, which in turn claims benefit of convention priority on Japanese Patent Application 8-12132, filed Jan. 26, 1996. All of the above-reference applications are incorporated herein by reference.

BACKGROUND OF THE INVENTION

1. Technical Field

The present invention relates to a component electronic catalog which enables easy selection of electronic components fit to the kinds of needs through a search operation and with the use of a display screen, as well as formation of mounting data for a mounting apparatus to automatically mount the selected electronic components without manual inputs of data related to the to-be-mounted components, mainly when the electronic components are mounted on electronic circuit boards by the mounting apparatus to form the boards.

2. State of the Art

There are many kinds of electronic components to be mounted to boards to produce various types of electronic circuit boards, some of which are replaceable with other kinds of components. The total number of kinds of electronic components is furthermore increased if compatible components among different manufacturers are included. In forming an electronic circuit board by mounting electronic components of various kinds to a board, it is necessary to select electronic components that meet various kinds of needs set in the design stage of the electronic circuit. In mounting the various kinds of components on boards, it is also necessary to consider, so as to mount the components properly and surely, not being mutually influenced by characteristics and durabilities of the electronic components to be mounted and other electronic components. A growing requirement these days is to correctly recognize shapes of components and highly accurately mount the components, especially as the lead pitch is minimized in accordance with the increased density of components.

More specifically, the kind of nozzles and chucks for carrying the electronic components, the moving speed of a mounting head equipped with the nozzles and chucks, necessary fall positions of the nozzles and chucks when taking out the electronic components from a component feed section or mounting the components, that is, heightwise positions when the nozzles and chucks take out the electronic components or heightwise positions when the nozzles and chucks mount the electronic components to the board, the moving speed of the board, which has at least one electronic component mounted thereon, particularly acceleration of the board, and various kinds of allowances, etc. should be taken into consideration when the electronic components are mounted to the board.

These various kinds of electronic components are packed in tapes to be automatically supplied to the mounting apparatus or are contained in trays, or handled in the form of sticks or in bulk. The component supply manner, including an accommodation pitch or the like of components, i.e., the form of packing the components, should also be taken in mind when mounting data are to be formed.

Meanwhile, when the electronic components are mounted, whether or not the electronic components are properly selected or directed is recognized, so that improper components are exchanged or the direction of the components is corrected based on the recognition results. In order to achieve the above inspection, it is necessary to form inspection data, as the mounting data, on the basis of information related to the electronic components such as shapes, surface reflectivities, colors, hue, polarity marks, printed characters, and color codes marked on the components, etc.

Component catalog brochures have been used heretofore to form the above-described mounting data or inspection data so as to select electronic components of various kinds in conformity with the need from the viewpoint of the circuit design and to mount the selected electronic components properly. Detailed and complicated component information are edited and recorded for every kind of electronic component in the brochures according to a predetermined classification method. In some cases, electronic components have been actually measured with the use of calipers or the like to obtain necessary data.

It is difficult not only to actually measure the electronic components as above, but to search for the electronic components meeting a need from the catalog brochures. The success of the optimum selection of required components depends on how carefully the catalog brochures are reviewed in detail, which consumes a large quantity of labor and time. In particular, the recent diversification of needs increases the number of kinds of electronic components which are provided, enlarging the amount of information data, thus furthermore hindering the optimum selection of components.

For solving the problem, a so-called component electronic catalog has been provided, whereby data of electronic components in the catalog brochures are handled as image data to be displayed on a screen. The image data, edited and stored according to a predetermined classification method in the electronic catalog, are read out and displayed on the screen by a special read device, a personal computer or the like, in accordance with predetermined classification and search procedures. The electronic components can thus be rationally searched and selected in a short time while the display screen is changed through the search or look-up operation. The electronic catalog EC using a storage medium such as a CD-ROM holds the image data for displaying various data of various kinds of electronic components on the screen in an image data file IMF as shown in FIG. 23. The image data file IMF holds character data such as numerics and characters and figure data such as pictures, figures, etc. together in one set or in a suitably divided state.

The above-described component electronic catalog EC stores various kinds of data of shapes, dimensions, surface states, characteristics, and usage, etc. of the electronic components as the image data to be displayed on the screen in the form of photographs, drawings, tables, and graphs, and naturally includes data for forming the mounting data of the components as well.

A flow chart of FIG. 24 shows a conventionally practiced sequence to form the mounting data with the use of the electronic catalog EC. The sequence will be described below. First, the electronic catalog EC is loaded to a read device and the read device is started to read out the catalog on the screen.

Then, a command is input through manipulation of a search key and setting of conditions in accordance with predetermined classification and search procedures. A command analysis section subsequently starts searching. Commands are repeatedly input until one electronic component is selected.

FIG. 25 shows a display screen obtained by designating a rough classification group of transistors and then searching bipolar transistors (PNP) . . . 2SA, 2SB in a detailed classification group. A cursor in the screen is located to point to the first component among 62 components concerned. A user can search for any component among the 62 components by moving the cursor to a column of the required component. As a result of this, one electronic component is selected to thereby detect image data of which component should be displayed on the screen. The image data of the detected component are displayed on the screen according to predetermined procedures by the user's manipulation.

For example, supposing that the user designates a search of the component 2SA1022 on the screen of FIG. 25 and manipulates an explanation key, image data related to the rudimental description of the component 2SA1022 are displayed on the screen as shown in FIG. 26.

When a search (S) is selected on the screen of FIG. 26, a list of display items in the rough classification group selectable on the screen of FIG. 26 is window-displayed as in FIG. 27. If an outline view is selected on the screen of FIG. 27 or directly from the screen of FIG. 26, image data related to the outer shape of the component are shown on the screen as indicated in FIG. 28. If a land view is selected, image data related to the land are displayed on the screen as in FIG. 29. If a taping size is selected, image data related to the taping size appear on the screen as in FIG. 30. Meanwhile, if a reel size is selected, image data related to the reel size are shown on the screen as in FIG. 31.

FIG. 32 is a window display of image data related to a characteristic curve when the characteristic curve is selected on the initial explanation screen when an electronic component of a motor control circuit of AN6650 is subjected to search. FIG. 33 is a window display obtained when an example of an applied circuit is selected with priority on the initial explanation screen of FIG. 32, with a block diagram added.

The user can relatively easily select the electronic components fit to the needs from the viewpoint of the circuit design by searching the component data as described hereinabove and freely visually confirm various kinds of data of selected and to-be-mounted components necessary to form mounting data of the selected electronic components by the above search. At the same time, the user can freely search data corresponding to a component mounting method by chucks or suction nozzles, or depending on whether the components are recognized or not or how the components are recognized, etc.

In order to form the mounting data based on the data visually confirmed with the use of the electronic catalog as above, the visually confirmed mounting data of components have been conventionally manually input to a special automatic data processor or an automatic data processor such as a personal computer, combined with preliminarily formed data of mounting positions of the components or the like, to thereby data-process and obtain the component mounting data.

The above-described utilization of the conventional electronic catalog enables relatively easy selection of electronic components satisfying the needs due to a programmed rational search system, so that various sorts of data can be efficiently visually confirmed one by one. However, the recorded data are image data intended totally for screen display and therefore cannot be directly used to automatically form the mounting data for mounting the selected electronic components. As such, the user is obliged to take the trouble to manually input the visually confirmed data to the automatic data processor while sequentially selecting the required electronic components in the search operation. In other words, it still takes a considerable amount of labor and time to form the mounting data even with the help of the conventional electronic catalog.

SUMMARY OF THE INVENTION

The present invention is devised to solve the aforementioned inconvenience and has for its object to provide a component electronic catalog which not only works in the same manner as the conventional electronic catalog thereby achieving screen search of components, but realizes automatic reading of component text data and automatic formation of mounting data of the components selected through the screen search, etc. without manual inputting of component data.

In accomplishing these and other aspects, according to one aspect of the present invention, there is provided a component electronic catalog including a storage medium storing:

image data of various kinds of components; and component text data necessary for mounting of the components which includes shapes and dimensions of the components in a manner to be read out.

According to a second aspect of the present invention, there is provided a component electronic catalog according to the first aspect, wherein the component text data includes packing forms and colors of the components.

According to a third aspect of the present invention, there is provided a component electronic catalog according to the first aspect, wherein the component text data comprises a component master file including data of names of the components; a component appearance file including data of the shapes and dimensions of the components; and a packaging file including data of package forms of the components.

According to a fourth aspect of the present invention, there is provided a component electronic catalog according to the third aspect, wherein the component appearance file comprises: a component shape file including data of the shapes and dimensions of the components; a component special shape file including data of special features of the components; a component characteristic master file including data of names and packaged color codes of the components; and a component polarity file including names of the components and presence/absence of polarities of the components, and the packaging file comprises a packing form file including data of packing form codes and packing form kind codes of the components and a reel data file including data of names and packed counts of the components.

According to a fifth aspect of the present invention, there is provided a component electronic catalog according to the first aspect, wherein the storage medium is detachable from a reading device for reading out stored contents of the medium from the medium.

According to a sixth aspect of the present invention, there is provided a component electronic catalog according to the fifth aspect, wherein the data stored in the storage medium are transmitted to an other device or vice versa by communication.

According to a seventh aspect of the present invention, there is provided a storage medium for storing data for access by an application program being executed on a data processing system, comprising:

a data structure stored in the medium as component electronic catalog, the data structure including information resident in a text data file used by the application program and including:

image data of various kinds of components and; component text data necessary for mounting of the components which includes shapes and dimensions of the components in a manner to be read out.

According to an eighth aspect of the present invention, there is provided a storage medium according to the seventh aspect, wherein the component text.data includes packing forms and colors of the components.

According to a ninth aspect of the present invention, there is provided a storage medium according to the seventh aspect, wherein the component text data comprises a component master file including data of names of the components; a component appearance file including data of the shapes and dimensions of the components; and a packaging file including data of package forms of the components.

According to a tenth aspect of the present invention, there is provided a storage medium according to the ninth aspect, wherein the component appearance file comprises: a component shape file including data of the shapes and dimensions of the components; a component special shape file including data of special features of the components; a component characteristic master file including data of names and packaged color codes of the components; and a component polarity file including names of the components and presence/absence of polarities of the components, and the packaging file comprises a packing form file including data of packing form codes and packing form kind codes of the components and a reel data file including data of names and packed counts of the components.

In the above, the storage medium stores not only the image data of various kinds of components including components to be mounted, but component text data necessary for mounting of components, e.g., shapes, dimensions, packing forms, colors and the like of the components. Therefore, with the utilization of the above storage medium, the component electronic catalog works in the same manner as the conventional component electronic catalog, that is, the component electronic catalog can be used for the purpose of screen search. At the same time, the component electronic catalog can obtain component text data for every component to be mounted at the respective mounting position by automatically read the necessary information from the component text data stored therein, on the basis of to-be-mounted component information of preliminarily formed mounting position data of components to be mounted. Accordingly, mounting data for supplying and mounting the components to predetermined positions by conventional mounting apparatus for instance, an NC program related to mounting positions of components, a component library related to the recognition of components such as shapes, dimensions, colors, etc. of components, a supply library related to supplied states of components, e.g., arrangement at a component feed section, etc. can be automatically generated through automatic data processing in the same manner as in the conventional art with the use of the mounting position data and data including the component text data for every component to be mounted at each mounting position. Since manually input data of various kinds of components necessary for forming the mounting data of every component to be mounted is eliminated, the labor and time consumed for forming the mounting data are greatly reduced.

BRIEF DESCRIPTION OF DRAWINGS

These and other aspects and features of the present invention will become clear from the following description taken in conjunction with the preferred embodiments thereof with reference to the accompanying drawings, in which:

FIG. 2 is an example of data of mounting positions of components used to form a component mounting data;

FIG. 3 is an example of component text data to be used to form the component mounting data;

FIG. 4 is an example of an NC program as the component mounting data;

FIG. 5 is an example of a component library as the component mounting data;

FIG. 6 is an example of an arrangement program as a supply library of the component mounting data;

FIG. 7 is an example of a supply position library as the supply library in the component mounting data;

FIG. 8 is a block diagram showing an example of contents stored in a storage medium as the component electronic catalog shown in FIG. 1;

FIG. 9 is a block diagram of an example of contents stored in a storage medium which stores programs for forming the component mounting data to be used by the component mounting data forming apparatus of FIG. 1;

FIG. 25 is a screen in the middle of a search for electronic components meeting a need by a rough classification and a detailed classification in accordance with the flow chart of FIG. 24;

FIG. 26 is a initial explanation screen of a transistor selected on the screen of FIG. 25;

BEST MODE FOR CARRYING OUT THE INVENTION

Figure 1B:
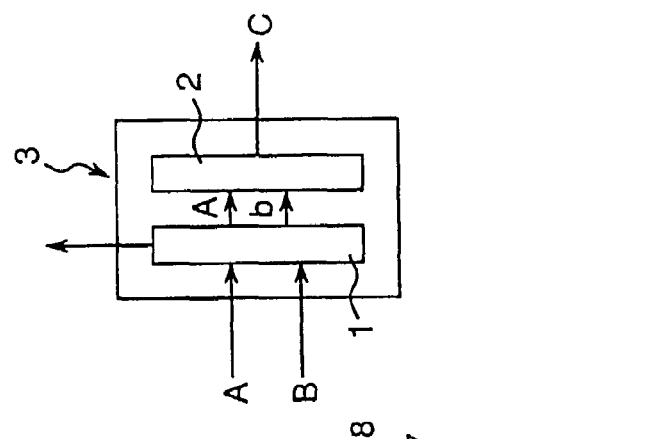
FIGS. 1A and 1B are schematic structural diagrams of a control system which forms a mounting data with the use of a component electronic catalog according to a first embodiment of the present invention, and a data processor thereof.

Before the description of the present invention proceeds, it is to be noted that like parts are designated by like reference numerals throughout the accompanying drawings.

Here, a component electronic catalog, and a method and an apparatus for searching data of various kinds of components and forming mounting data for selected components with the use of the component electronic catalog, according to embodiments of the present invention will be discussed in conjunction with preferred embodiments thereof.

Figure 1A:
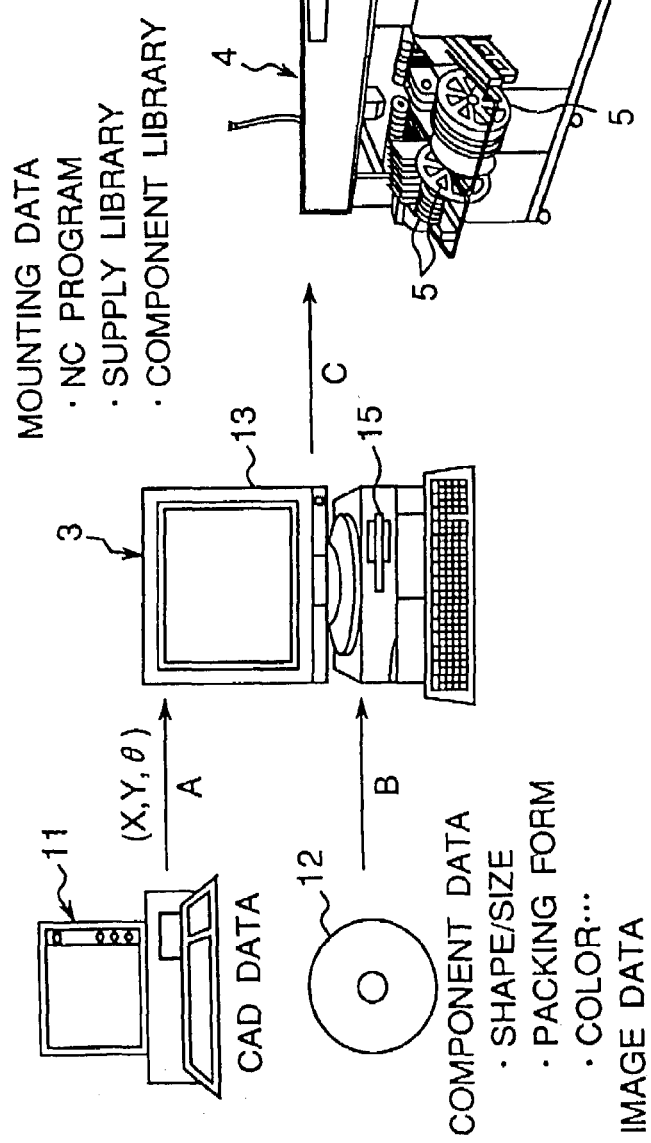

According to a first embodiment of the present invention, as shown in FIG. 1A, a storage medium (computer readable medium) 12, which is a CD-ROM is used as the component electronic catalog. A data processor 3 separate from a mounting apparatus 4 makes a search for electronic components and automatically forms mounting data for the components selected through the search. The data processor 3 has, as its internal function, a data reading (reading-processing) means 1 and a data forming (forming-processing) means 2 as shown in FIG. 1B. Although a personal computer is preferred as the data processor 3, a special device may be used or, a data processor or a control system of the mounting apparatus 4 can be used depending on the situation.

A required number of component feed cassettes 5 storing taped components is loaded in the mounting apparatus 4. Every time a necessary electronic component is fed from the feed cassettes 5 to the mounting apparatus 4, the mounting apparatus 4 checks whether or not the component is correct through recognition and measures such as correction of the component are taken if the component is not correct, and thereby it correctly and highly accurately mounts the component to a board 6 automatically. A data processor 8 is installed in the mounting apparatus 4, apart from a control system 7 provided for controlling the above automatic mounting.

The data processor 8, equipped with a display 9, forms an operation control program, as control data to be used at the control system 7, to control actual feeding of components and to mount the supplied components to predetermined positions, with reference to an NC program as mounting position data for every component to be mounted, a supply library related to supplied states of components, e.g., the arrangement of components at a component feed section, and a component library for correctly and surely recognizing and mounting the supplied components to predetermined positions, etc. Mounting data C is formed based on requirements from the functional level of the mounting apparatus 4 or supplied states of components, etc., in other words, corresponding to the nature of the mounting apparatus 4. Specific contents of the mounting data can be set freely.

The data reading means 1 reads out, through automatic data processing, component text data b of every component to be mounted at the respective mounting position from component text data B of FIG. 3 related to shapes, dimensions, packing forms, colors and the like of components and necessary for mounting of components, which is formed beforehand together with image data IM of various kinds of components including components to be mounted and stored in the storage medium 12 as the component electronic catalog, based on position data A of FIG. 2 related to mounting positions of the components to be mounted. The data forming means 2 automatically data-processes the mounting position data A and data including the component text data b of every to-be-mounted component at each mounting position read out by the reading means 1, to thereby form the mounting data C for the mounting apparatus 4 to mount the supplied components at the predetermined mounting positions of a board.

The mounting data C is, for instance, an NC program, a component library, an arrangement program as a supply library, and a supply position library, etc. as shown in FIGS. 4–7. The supply position library relates to conditions of take-out positions when the components are to be taken out and fed by trays.

The mounting position data A can be formed, e.g., by a device for CAD 11 and input to the data processor 3 every time each piece of mounting position data is formed, or total pieces of mounting position data may be stored once and transferred to the data processor 3. Alternatively, a storage medium storing the mounting position data A may be loaded to the data processor 3 for its utilization. The storage medium 12 providing the component text data B stores therein, as shown in FIG. 8, the image data IM of various kinds of components including components to be mounted and the component text data B of necessary information for mounting of components, e.g., shapes, dimensions, packing forms, colors and the like of components. Both data are stored in the storage medium 12 after being edited in accordance with a predetermined classification method. Therefore, by using both the image data IM and the component text data B, various kinds of data on the electronic components can be displayed on the screen according to predetermined procedures and search operations, to be utilized as a component electronic catalog, similar to the conventional art. An interface for this purpose may be provided at either side of the storage medium 12 and the data processor 3. It is also possible to make a required screen display of various kinds of electronic components only by the image data IM.

Any storage medium or storage device other than a CD-ROM is utilizable as the storage medium 12, not to mention a flexible disk, an optical disk, etc. A read/write memory is most preferable for post-treatments, that is, to add, delete, and correct data afterwards. To write data is achieved by a specialized device or a general-purpose personal computer. On the other hand, to add, delete, or correct data may be automatically performed in accordance with the mounting history by the mounting apparatus 4.

In the first embodiment, the storage medium 12 works as the component electronic catalog storing the component text data B of necessary information for mounting of components such as shapes, dimensions, packing forms, colors, etc. of the components as well as the image data IM of various kinds of components including components to be mounted, thus realizing the search on the screen in the same manner as in the conventional art. In addition to the above function, the first embodiment automatically reads out corresponding data from the component text data B stored together with the image data IM in the storage medium 12, on the basis of the data of the components to be mounted in the mounting position data A preliminarily formed for each to-be-mounted component, and obtains the component text data b for every component to be mounted at each mounting position. Therefore, the, mounting data C, i.e., the NC program related to the mounting positions of components required by the conventional mounting apparatus 4, the component library related to the recognition of electronic components, e.g., shapes, dimensions, colors, etc. of components, and the supply library related to the supplied states of components such as the arrangement of components at the component feed section can be formed through the same automatic data processing as in the conventional art with the use of the mounting position data A and the data including the component text data b of every component to be mounted at the mounting position. That is, the mounting data C for feeding and mounting each component to a predetermined mounting position in the conventional mounting apparatus 4 can be formed through the automatic data processing.

Since manually input data of various components necessary for forming the mounting data C of every component to be mounted is eliminated, the time and labor for forming the mounting data are greatly reduced.

Needless to say, the mounting data C should be formed correspondingly depending on the type or control level of the mounting apparatus 4. If the mounting data C is formed with characteristic data of the mounting apparatus 4 taken into consideration, the mounting data C obtained fits the characteristics of the mounting apparatus 4, in other words, the mounting time is rendered shortest and handling of components becomes easy and ready without failures, with the effect of more proper mounting. The mounting data C may be arranged to include inspection data for correct mounting of components. The inspection data to detect whether components held by nozzles or chucks are directed properly, and exchange improper components to proper ones, or correct a component improperly directed, is generated by the component text data b formed for every component. Therefore, the inspection data suitable for the components to be mounted can be obtained automatically. The components can be inspected more properly with the same amount of labor and time and consequently, accurate component mounting can be assured.

The storage medium 12 according to the first embodiment of the present invention stores both the component text data B and the image data IM corresponding to various kinds of components as described hereinabove. Both the image data IM and component text data B stored in the storage medium 12 can be read out for every component by the reading means 1 in a predetermined search operation, fed as a video signal D to a display 13 of the data processor 3 and displayed on the same screen. In addition, the component text data can be output to other devices through an output operation.

Since the image data IM and component text data B stored in the storage medium 12 are displayed for each component on the same screen of the display 13 by the search operation, the search and selection among various kinds of components is enabled. The component text data B can be utilized for processing of various data because the data can be output to other devices, if necessary.

When the above storage medium 12 storing the image data IM and component text data B is outside the apparatus as in the first embodiment, various data can be input independently of the data processor 3, which is an apparatus for forming the mounting data, and changed or added easily. Moreover, the storage medium can be used in common in various mounting apparatuses 4.

In the case where the data are transmitted through communication by the storage medium 12 storing the component text data B, one storage medium 12 is commonly used among many mounting apparatuses 4 without limits as to the location. Furthermore, this is convenient to form, manage, change, or add the component text data B. The above communication is carried out by wire, radio, telephone line, optical communication or any other method not specifically determined.

Meanwhile, the data-processing program used in the data processor 3 can be stored in an external CD-ROM 15 as shown in FIG. 9 or other appropriate storage media. The stored contents of the program are a data-reading program file 15a and a data forming-processing program file 15b. The data reading-forming program file 15a relates to a program for reading out, by controlling the data reading means 1, the component text data b corresponding to the components to be mounted at the mounting positions from the component text data B necessary for mounting of components, e.g., shapes, dimensions, packing forms, colors, etc. of the components which is preliminarily formed together with the image data IM of components including the components to be mounted and stored in the storage means, for example, the storage medium 12 on the basis of the mounting position data A related to the mounting positions including mounting angles of the components to be mounted. The data-forming program file 15b relates to a program for forming, by controlling the data forming means 2, the mounting data C for the mounting apparatus 4 to receive and mount the components to be mounted to the respective mounting positions from the mounting position data A and the data including the component text data b read out by the data reading means 1 in correspondence with the mounting position data A. However, the stored contents of the program are not limited to the above, and the specific stored form may be selected freely.

In the above-described constitution of the present invention, data of various programs can be input independently apart from the data processor 3, as the mounting data forming apparatus, and changed or added easily. The programs may be commonly used among mounting apparatuses 4 of the same type.

The formation of the mounting data C will be discussed more specifically below.

Figure 10:
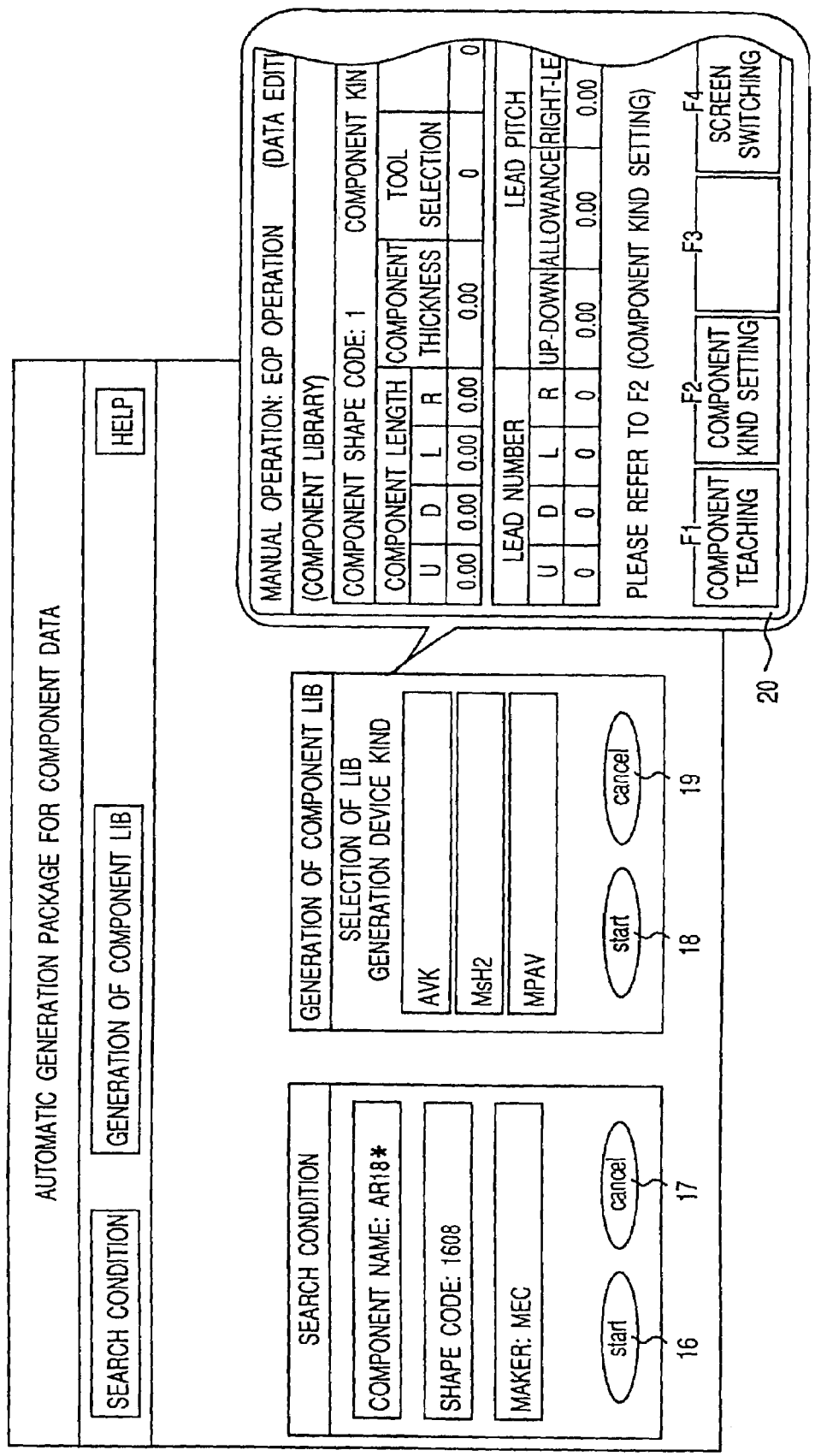
FIG. 10 is an example of an operational screen manipulated to form the component mounting data.

As representative examples of the mounting data C, there are described earlier the NC program indicating mounting positions of components, the component library for recognition of various electronic components, the arrangement of various electronic components at the component feed section, and the supply library relating to the supply of components, e.g., conditions of take-out positions when the components are supplied in trays. The supply library includes, for example, data indicating loading positions of many component feed cassettes set in a component feed apparatus when the apparatus feeds selected components to the mounting apparatus 4 while moving the cassettes in an axial direction of a feed shaft. Other necessary data are formed from the supply library. FIG. 10 is an operation screen of the display 13 in a mode generating the component library. The electronic components corresponding to the respective mounting positions in the position data A are searched by a start key 16 and a cancel key 17. A component library 20 corresponding to the type or model of a component library generation device set by a different start key 18 and a different cancel key 19, etc. is automatically formed based on the component text data b read from the component text data B corresponding to each of the searched components and the position data A.

Other items to be taken into consideration when the components are mounted are the kind of nozzles and chucks holding the electronic components, a moving speed of a mounting head with the nozzles and chucks, required fall positions of the nozzles and chucks when the electronic components are mounted, that is, mounting heights of the components to the board, a moving speed of the board with the electronic components mounted, particularly an acceleration thereof, and various allowances thereof. These various electronic components are accommodated, for example, in tapes or in trays so as to be automatically supplied to the mounting apparatus. Packing conditions including the supplied state of components as above and a storing pitch of the components in such a state should be also taken into consideration. According to the present invention, this kind of data can be automatically formed as the component library or other mounting data C.

Before the electronic components are mounted, whether the components are properly directed or proper components are selected is detected, based on which result the improper components are exchanged or improper directions of the components are corrected, etc. This inspection requires the component text data B related to recognition of the electronic components, i.e., shapes, surface reflectivities, colors, hue, polarity marks of components, printed characters or color codes on the components, etc., and such inspection data as required by the component text data B can be automatically formed as the mounting data C in the present invention.

In some cases, inspection data for boards after the electronic components are mounted can be formed automatically.

If the component text data B includes data of codes of package materials, surface roughness, surface shapes and the like of electronic components, and shapes, dimensions, weight, etc. of components, and if the mounting data C is for determining whether to suck the electronic components by nozzles is optimum or to hold the components by chucks is optimum; the moving speed of the mounting head with the nozzles and chucks, suction powers of nozzles; the moving speed, especially acceleration of the board after the electronic components are mounted thereto; various allowances; and the packing forms such as by tapes and trays, i.e., the supplied states of components in the tapes and trays, specifically, the presence/absence of covers or push pins, the accommodating pitch of components in tapes and trays, a count of accommodating rows and a pitch of rows in each tray, then the following mounting conditions can be set: the presence/absence of the detachment of the covers; the presence/absence of the movement of the push pins; and one push per one-pitch feed or one push per two-pitch feed depending on a difference of the feed pitch of the components, etc.

Concrete examples of the first embodiment of the present invention will be described hereinbelow. The component text data B relating to various electronic components as shown in FIG. 8 is divided to a component master file $B_1$, a component shape file $B_2$, a component special shape file $B_3$, a component characteristic master file $B_4$, a packing form file $B_5$, a component polarity file $B_6$, a reel data file $B_7$, etc. when the component text data B is stored in the storage medium 12. The data B may be freely divided by any other method. For example, the component text data B may be classified into the component master file $B_1$; a component appearance file $B_{10}$; and a packaging file $B_{11}$. The component appearance file $B_{10}$ includes the component shape file $B_2$, the component special shape file $B_3$, the component characteristic master file $B_4$, and the component polarity file $B_6$. The packaging file $B_{11}$ includes the packing form file $B_5$ and the reel data file $B_7$. The component master file $B_1$ sets component names, codes of manufacturer names, classification codes, kind codes, shape codes, and packing form codes of components as the most significant (highest order) data. The master data are called and displayed on the screen, so that contents of items are selected and displayed in accordance with a selection operation by the user.

The component kind codes are manually input individually for every kind of electronic components in the component kind data. Shape codes are manually input for every shape defined so as to manage the components by shapes in the shape codes.

A part of these examples will be briefly indicated below.

Data contents of the component shape file B2 are shape codes, component kind codes, presence/absence of leads, body outer configurations LR, body edge shapes DU, body thicknesses, special body thicknesses, component heights, shape size allowances, electrode widths, electrode lengths, electrode heights, etc.

Data contents of the special shape file B3 are shape codes, side numbers, special electrode dispositions, special electrode existence positions, special electrode widths, special electrode lengths, special electrode heights, special root electrode widths, special lead thicknesses, etc.

Data contents of the component characteristic master file B4 are component names, package color codes, package material codes, etc.

Data contents of the packing form file B5 are packing form codes, packing forth kind codes, X-directional tray pitches, Y-directional tray pitches, X-directional counts of component rows, Y-directional counts of component rows, counts of accommodated components, tape widths, tape feed pitches, taping directions/feed directions, etc.

Data contents of the component polarity file B6 are component names, presence/absence of polarities, polarity mark groups, polarity mark shape size 1, polarity mark shape size 2, polarity mark X coordinates, polarity mark Y coordinates, polarity mark angles, right-left symmetric/asymmetric components, etc.

Data contents of the reel data file B7 are component names, packed counts, etc.

Hereinbelow are shown some examples of component kind codes set corresponding to kinds of components.

In the following, chip components are electronic components to be mounted on the surface of the board, e.g., angular chip resistors or the like. Axial components are components having leads to be inserted into holes of the board, more specifically, components inserted in a sidewise directed state such as resistors or the like. On the other hand, radial components are components having leads to be inserted into the holes of the board. The radial components are, for instance, aluminum electrolytic capacitors, etc. inserted in a lengthwisely directed state.

Kind codes of chip components are:
Isolator: ATC
Dielectric filter: BPP
Aluminum electrolytic capacitor: CAPALR
Cylindrical chip capacitor: CAPSYL
Film capacitor: CAPPULM
CC: CC
Connector: CNT
Mini diode: DIMINI
New mini power diode: DINMIHIPW
S mini diode: DISMINI
Multiplexer: EZFA
Receiving filter: EZFS
Filter: FLT
Noise filter: FLN
oscillation filter: FSA
Mini power IC: ICMINIPW
Mini IC: ICMINI
IF module: IF
LC filter: LCFLT
NL filter: NLFLT
Crystal filter: QFT Kind codes of axial/radial/jumper components are:
R-beads core: R-BC
R-capacitor: R-CAP
R-three-terminal capacitor: R-CAP3
A-beads core: A-BC
Jumper wire: J-JUMPER Examples of shape codes set corresponding to kinds of components will be indicated below.

Hereinbelow, the unit of size in codes is made uniform for every kind of component, set by two digits of the actual size, for instance, 301515 when the component has a 3 mm length, a 1.5 mm width and a 1.5 mm height, and 201303 when the component has a 20 mm length, a 13.5 mm width and a 3.5 mm height.

Among the chip components:
Isolator: ATCB57 (ATC+shape symbol I+height 2)
Dielectric filter: BPPB45 (BPP+shape kind 1+height 2)
Aluminum electrolytic capacitor: ALCB57 (ALC+shape symbol I+height 2)
Cylindrical chip capacitor: 2125C (diameter 2+length 2+C)
Film capacitor: 4833FC13 (length 2+width 2+FC+height 2)
CC: CC014BI01008 (CC+pin count 3+B+length 2+width 2+height 2)
New mini power diode: NMINIPWDIL315 (shape kind 5+components kind 2+L+lead count I+height 2)

For the axial/radial/jumper components:
Beads core: 2545RBC28 (length 2+width 2+RBC+height 2)
Capacitor: 4532CAP32 (length 2+width 2+CAP+height 2)
Three-terminal capacitor: 1207CAPCN15 (length 2+width 2+CAPON+height 2)

Packing form codes are as follows:
Paper tape (paper, adhesive paper): P0804OO0 (the first digit P is a kind code of paper, which becomes N in the case of adhesive paper. The second two digits 08 indicate a tape width of 8 mm and the succeeding two digits 04 indicates a tape feed pitch of 4 mm. The next two digits OO is a system reservation. The last digit 0 shows an angle of 0°.)

The angle code is 0 when the angle is 0°, 1 when the angle is 90°, 2 when the angle is 180°, and 3 when the angle is 360°.

Embossed tape: E0804081 (the first digit E is a kind code. The two digits 08 indicate a tape width of 8 mm and the following two digits 04 indicate a tape feed pitch of 4 mm. Further, the next two digits 08 show an emboss depth. The last digit 1 is the angle code of 90° as mentioned above.)

Matrix tray: T1020OO1 (the first digit T is a kind code. The second two digits 10 are a count of rows in the Y direction, the next two digits 20 are a count of rows in the X direction, and the next two digits OO are a sequential number assigned under the management of the operator when the tray pitch is different. The last digit 1 is the angle code.)

Stick: S08OOOO2 (the first digit S is a kind code, the following four digits OOOO are a system reservation, and the last digit 2 is the angle code.)

Bulk: BOOOO3 (the first digit B is a kind code, the four digits OOOO indicate a system reservation, and the last digit 3 is the angle code.)

Cut leads are components having leads cut. Codes for the cut leads are not specifically defined in the first embodiment, and selected and registered corresponding to the components concerned. The cut lead code may be set freely so long as it has 20 or fewer characters. However, the component with a cutting number of 0 is set to be CUT0000.

Because of a small amount of data related to electrode shapes, electrodes are classified simply as:
Integral type: 1
Gull wing type: 2
J lead type: 3
Flat lead type: 4
Separated type: 5
Insertion type: 6
Butt lead type: 7
Volume type: 8

The shape names of electrodes are input for recording through a keyboard. It does not matter if the shape names are input by Chinese characters.

Figure 11:
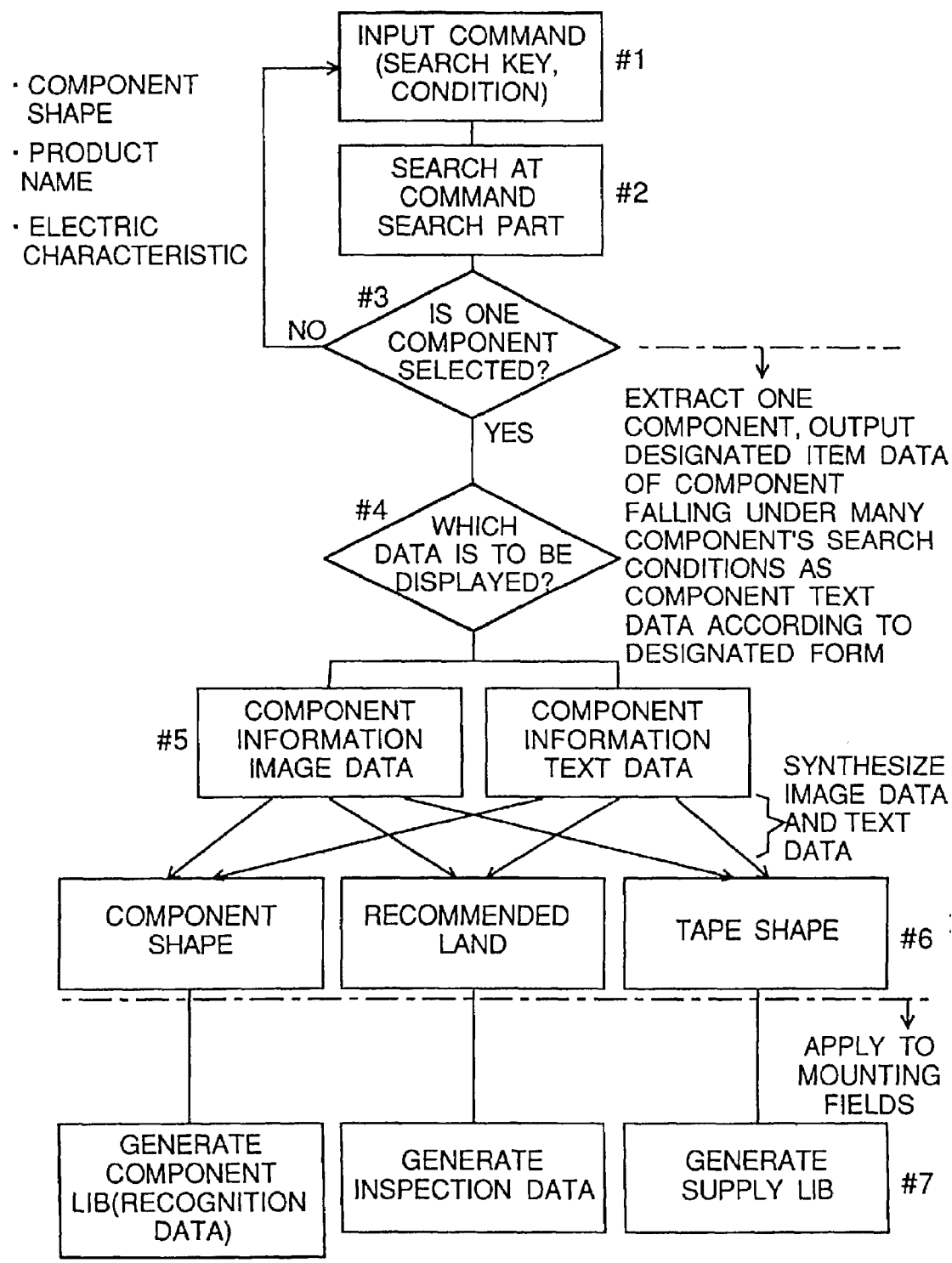
FIG. 11 is a flow chart showing search procedures when the component electronic catalog of the system in FIG. 1 is utilized for a screen search.

A case where the storage medium 12 storing the component text data B and image data IM is subjected to screen search and utilized will be described below. A flow chart of FIG. 11 shows search procedures in the first embodiment.

When the data processor 3 is started in a read mode to read out the component electronic catalog, a search guide screen appears on the display 13, sequentially showing guides for the search according to predetermined search procedures. Data of the component master file B1 are shown as the first screen to be searched. A required one among the master items related to the component displayed on the screen is selected by moving the cursor. Termination of the selection is input through an OK key on the screen, whereby the display screen is changed and less significant data related to the selected item are shown thereon.

Figure 12:
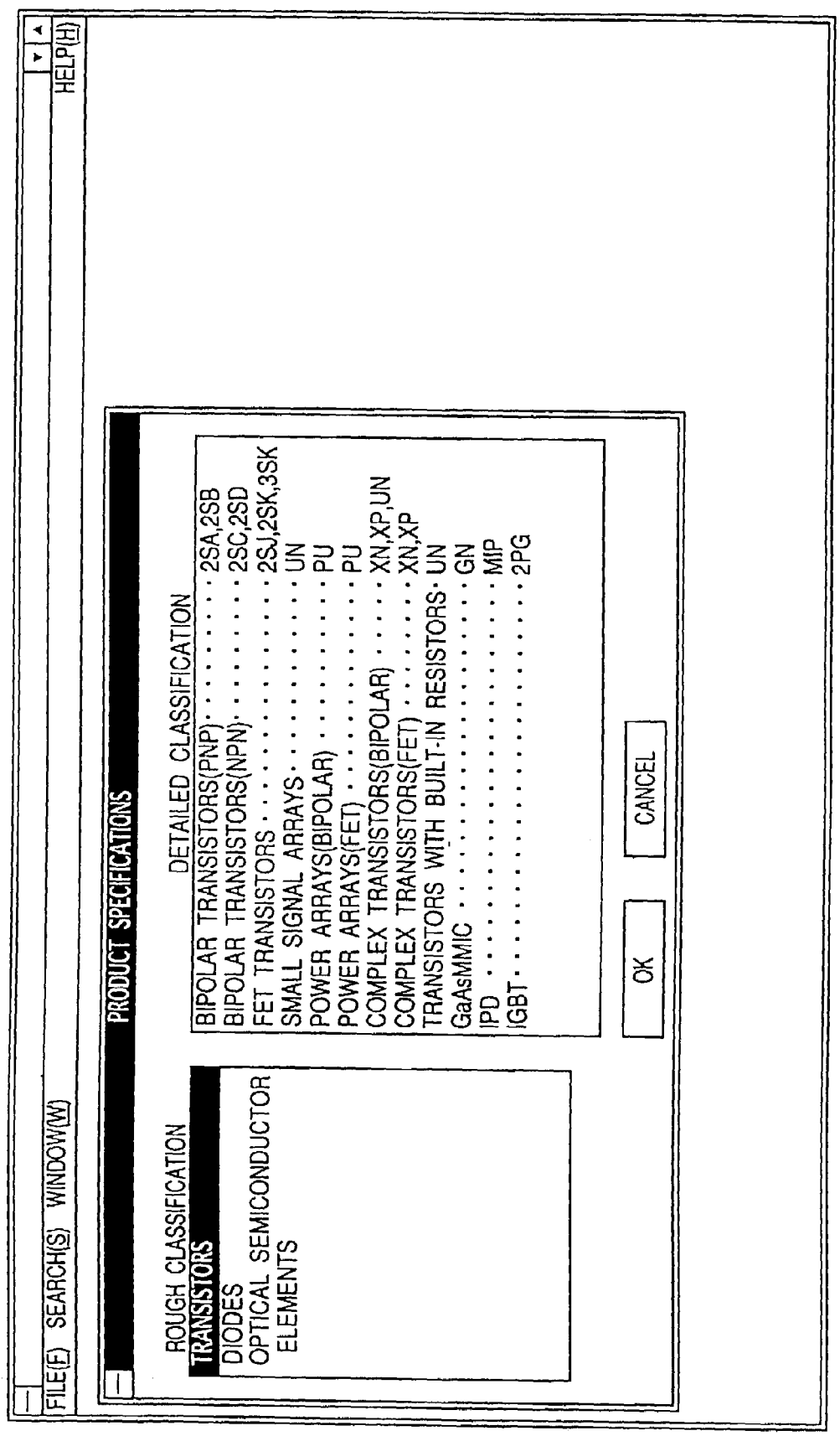
FIG. 12 is a screen in the middle of the search for electronic components meeting needs in accordance with the flow chart of FIG. 11.

Supposing that the selected master item is a component classification code, component items in a rough classification group of components are displayed on the screen as the less significant screen. In response to the OK key operation after the selection, the screen is changed to a still less significant screen based on the selection. As a result, rough classification data of semiconductors, i.e., item data of transistors, diodes, and optical semiconductor elements, and detailed classification data of transistors selected by the cursor among the rough classification, namely, detailed classification component items such as bipolar transistors (PNP) . . . 2SA, 2SB, etc. are displayed on the screen, as shown in FIG. 12. When the cursor is moved to a different item in the rough classification data, for example, diodes, the display screen of the detailed classification data is changed from one related to transistors to one related to diodes.

Figure 13:
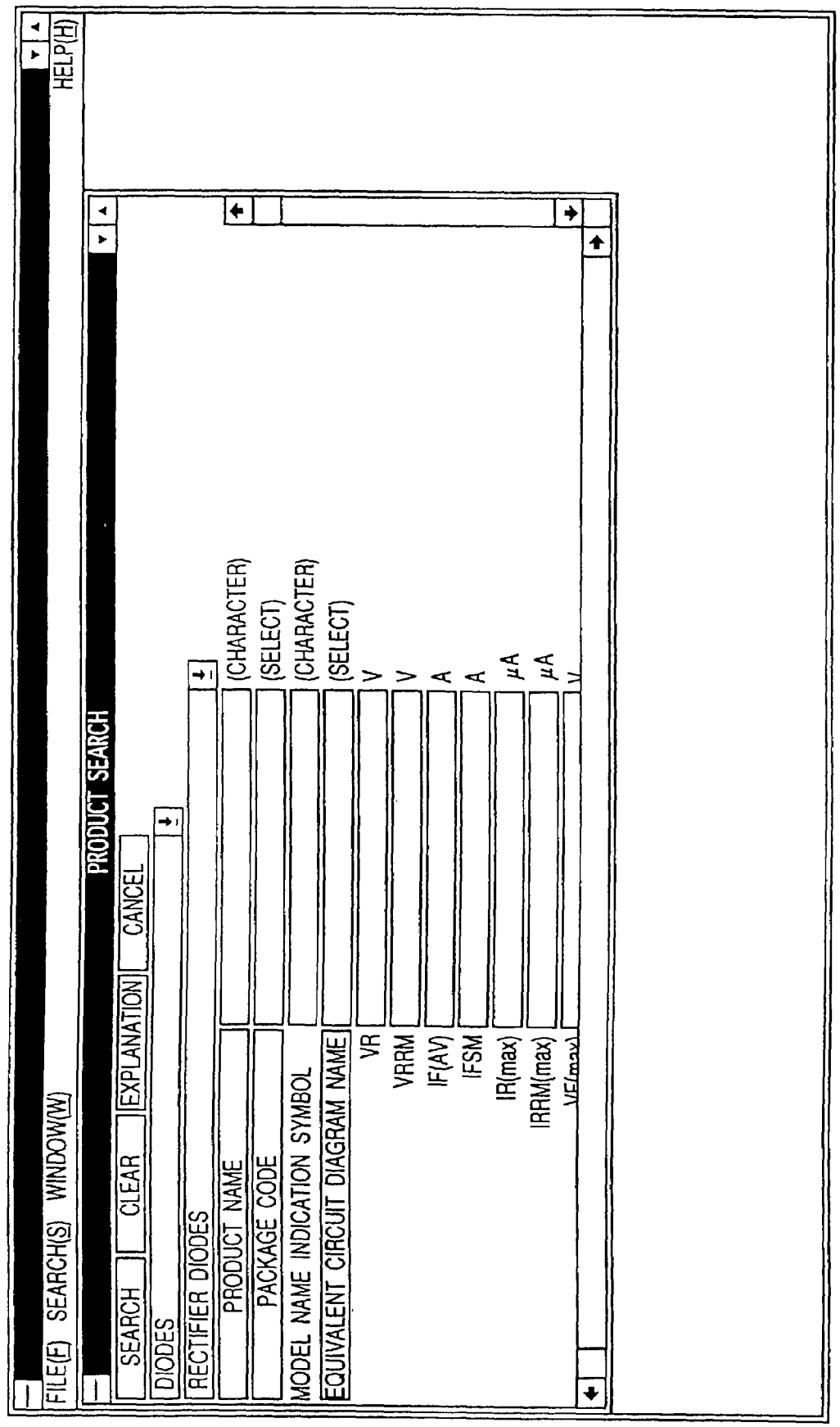
FIG. 13 is a search screen when a specific kind of rectifier diodes is selected on the screen of FIG. 12.
Figure 14:
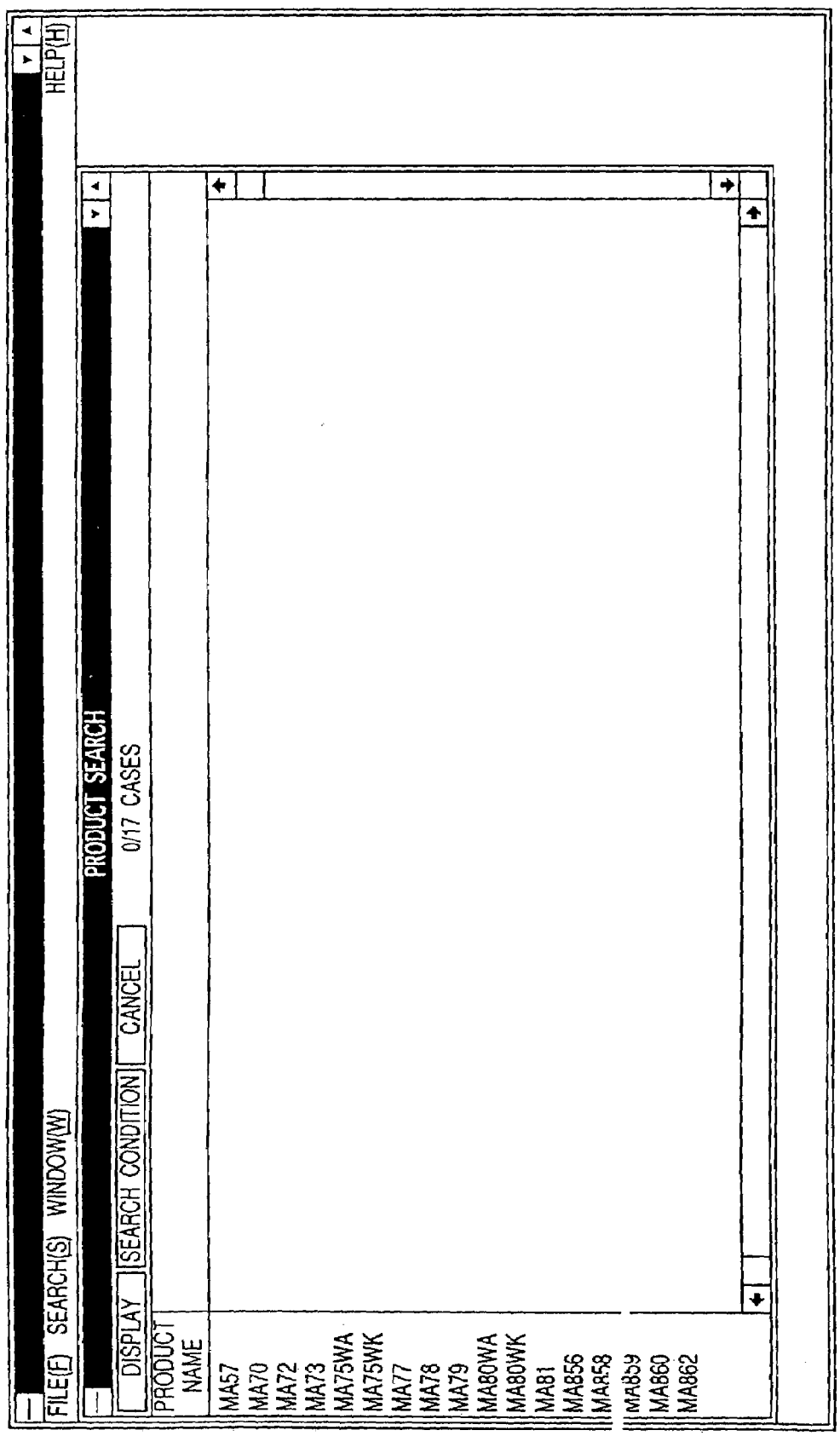
FIG. 14 is a search screen showing the minimum classification group of rectifier diodes of the specific kind displayed on the screen of FIG. 13.

Upon selection of a rectifier diode in the detailed classification data, the whole screen is changed to a screen related to the selected diode, and an explanatory screen of FIG. 13 is displayed when an item for explanation is selected. If the screen is returned to the search screen, a final selection screen of FIG. 14 is displayed.

Figure 15:
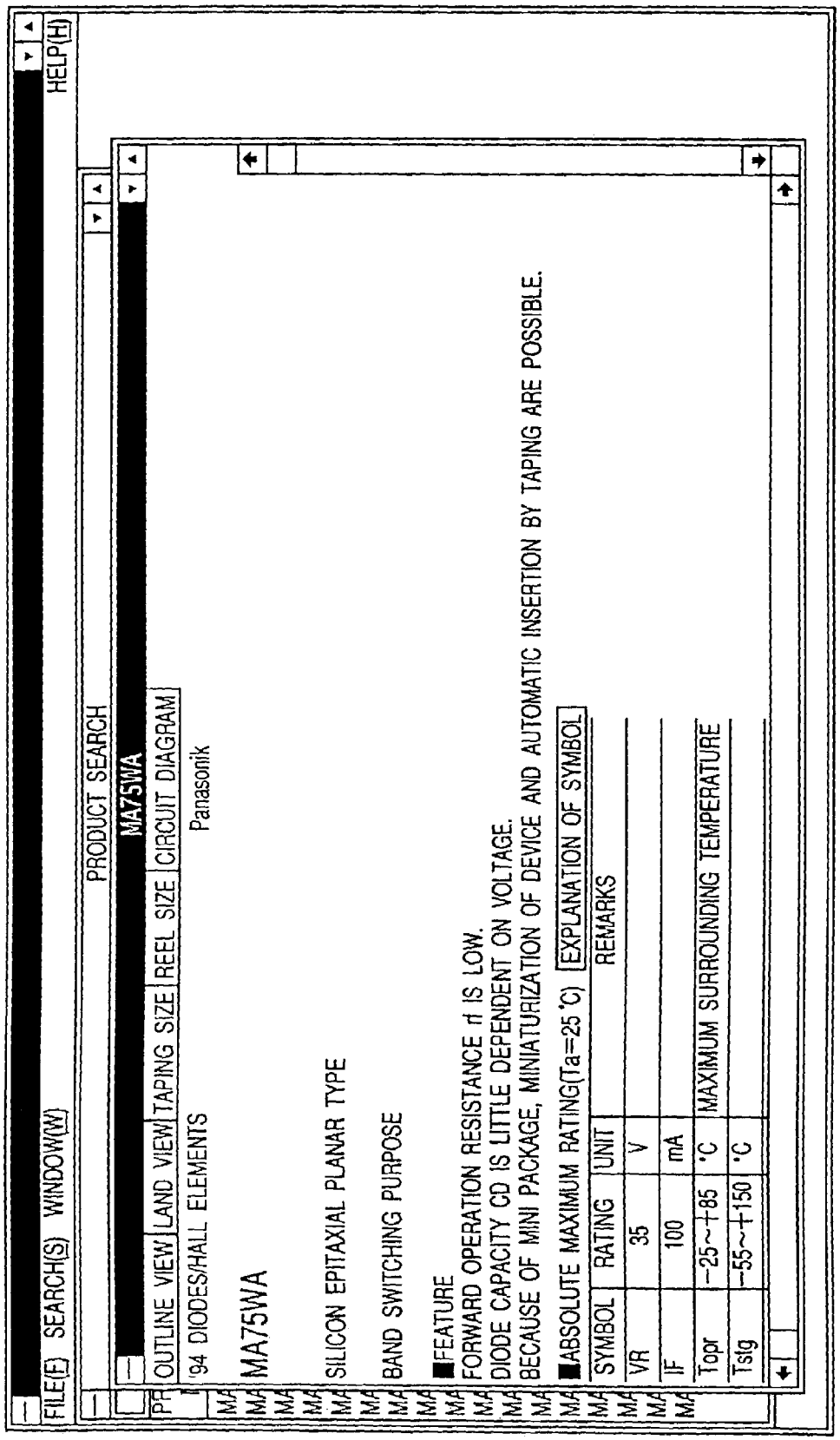
FIG. 15 is an explanatory screen of one rectifier diode selected on the screen of FIG. 14.

At this occasion, if a rectifier diode (code MA75WA) as the example meeting the need is selected, in other words, one electronic component is selected, basic data of various kinds related to the selected electronic component are indicated on the screen as in FIG. 15. This completes operations at steps #1–#3 in the flow chart of FIG. 11.

Thereafter, a screen to be displayed next is selected on the screen of FIG. 15 which results from the operation in step #3, in accordance with the aim of obtaining component data for selecting a component satisfying the need or forming the mounting position data A of the selected component or the like. For example, an outline view, a recommended land, a tape shape, etc. is selected. An operation at step #4 is finished here.

Figure 16:
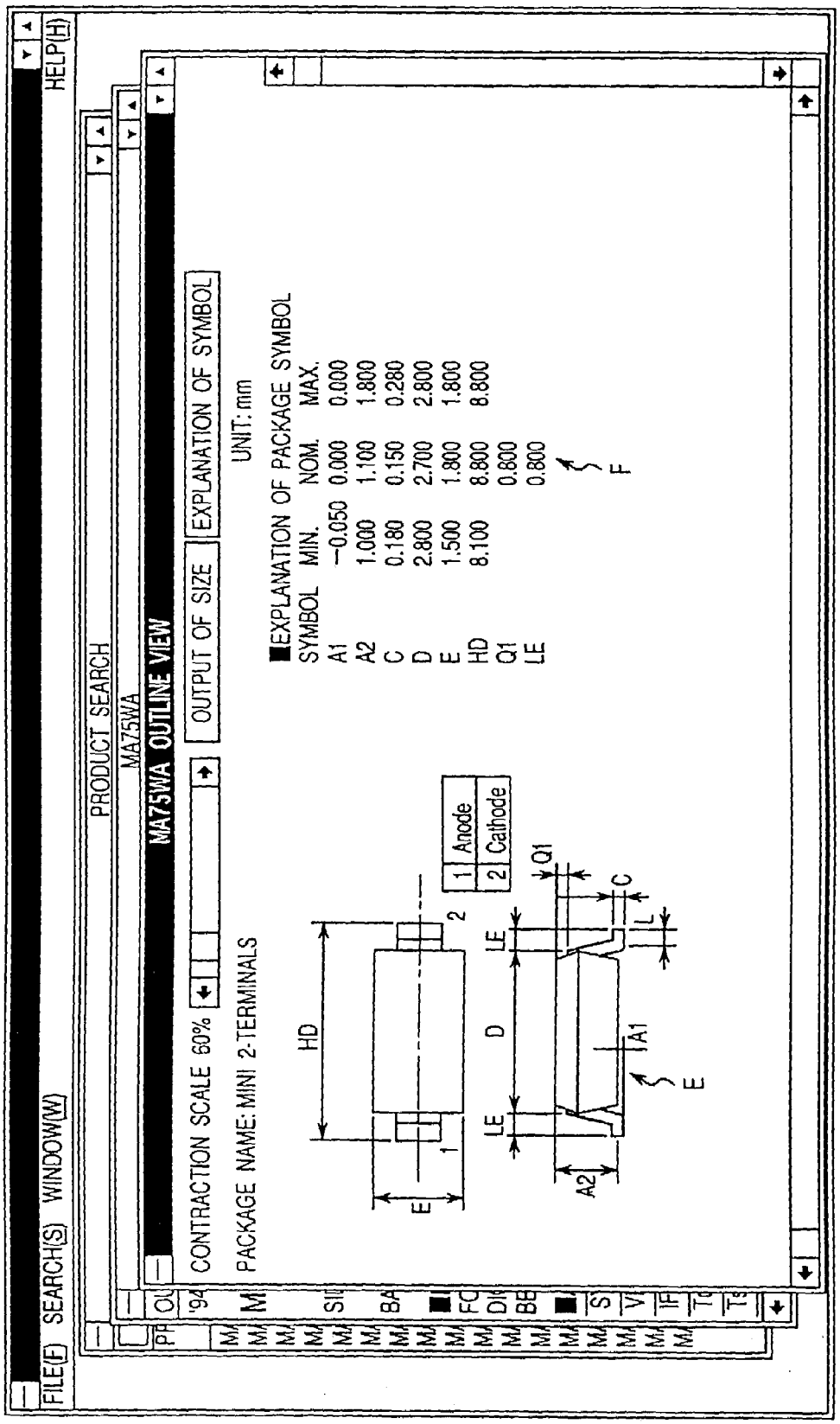
FIG. 16 is a screen of an outline view of the rectifier diode due to the final search displayed on the screen of FIG. 14.

In selecting the outline view through the operation at step #4, the image data IM corresponding to the outward shape of the selected electronic component and the component text data B corresponding to the size of the selected electronic component are read out from the storage medium 12 and synthesized at step #5, to thereby obtain a screen display as shown in FIG. 16. The screen displays an outline view E with dimension lines of the electronic component and component text data F of dimensions corresponding to the dimension lines at the same time. When an output of size is selected on this display screen, the component text data F can be output elsewhere.

Figure 17:
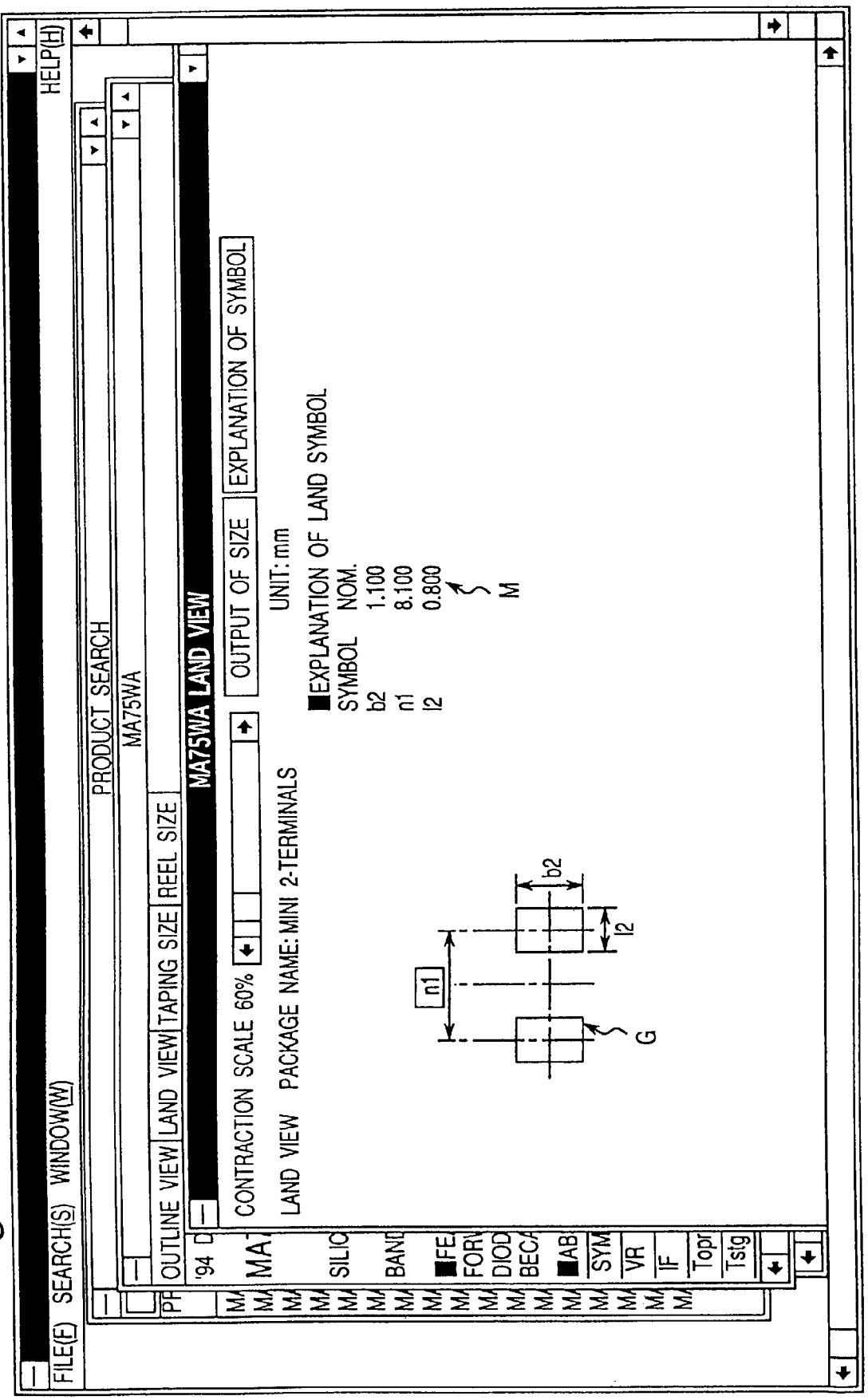
FIG. 17 is a screen showing a land view of the rectifier diode due to the final search displayed on the screen of FIG. 14.

When a land view is selected through the operation at step #4, the image data IM corresponding to the land shape of the selected electronic component and the component text data B corresponding to the land size of the selected electronic component are read out from the storage medium 12 and synthesized at step #5, to thereby obtain a screen display as indicated in FIG. 17. The screen simultaneously displays an outline view G with dimension lines of the land and a component text data M of dimensions corresponding to the dimension lines on the screen. If an output of size is selected on the screen, the above component text data M can be output elsewhere.

Figure 18:
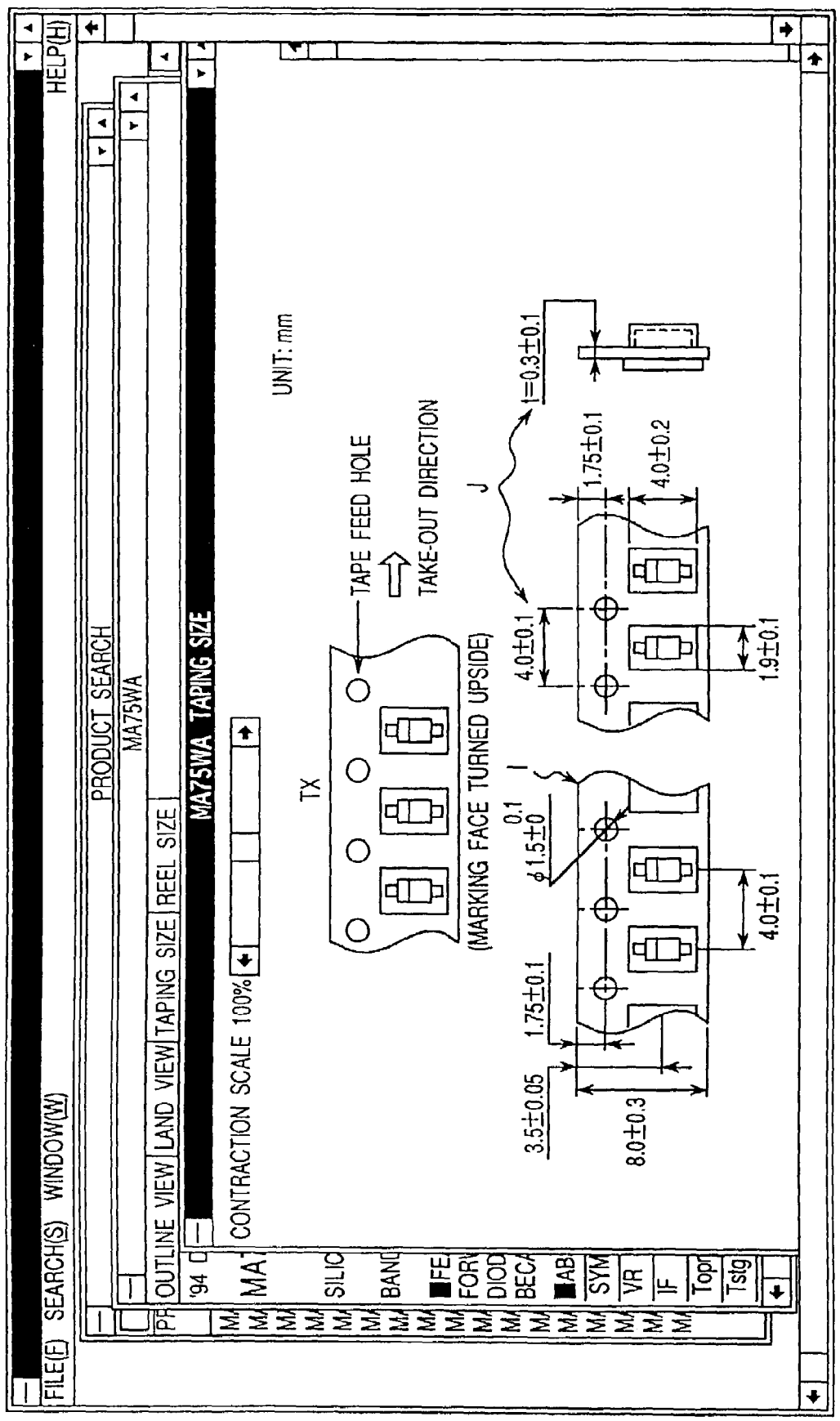
FIG. 18 is a screen showing a taping size of the rectifier diode due to the final search displayed on the screen of FIG. 14.

When a taping size is selected through the operation at step #4, the image data IM corresponding to the taping shape of the selected electronic component and the component text data B related to the taping size of the selected electronic component are read out from the storage medium 12 and synthesized, which is displayed on the screen as shown in FIG. 18. A form view I of a tape with tape dimension lines and component text data J of dimensions corresponding to the dimension lines are displayed on the screen.

Figure 19:
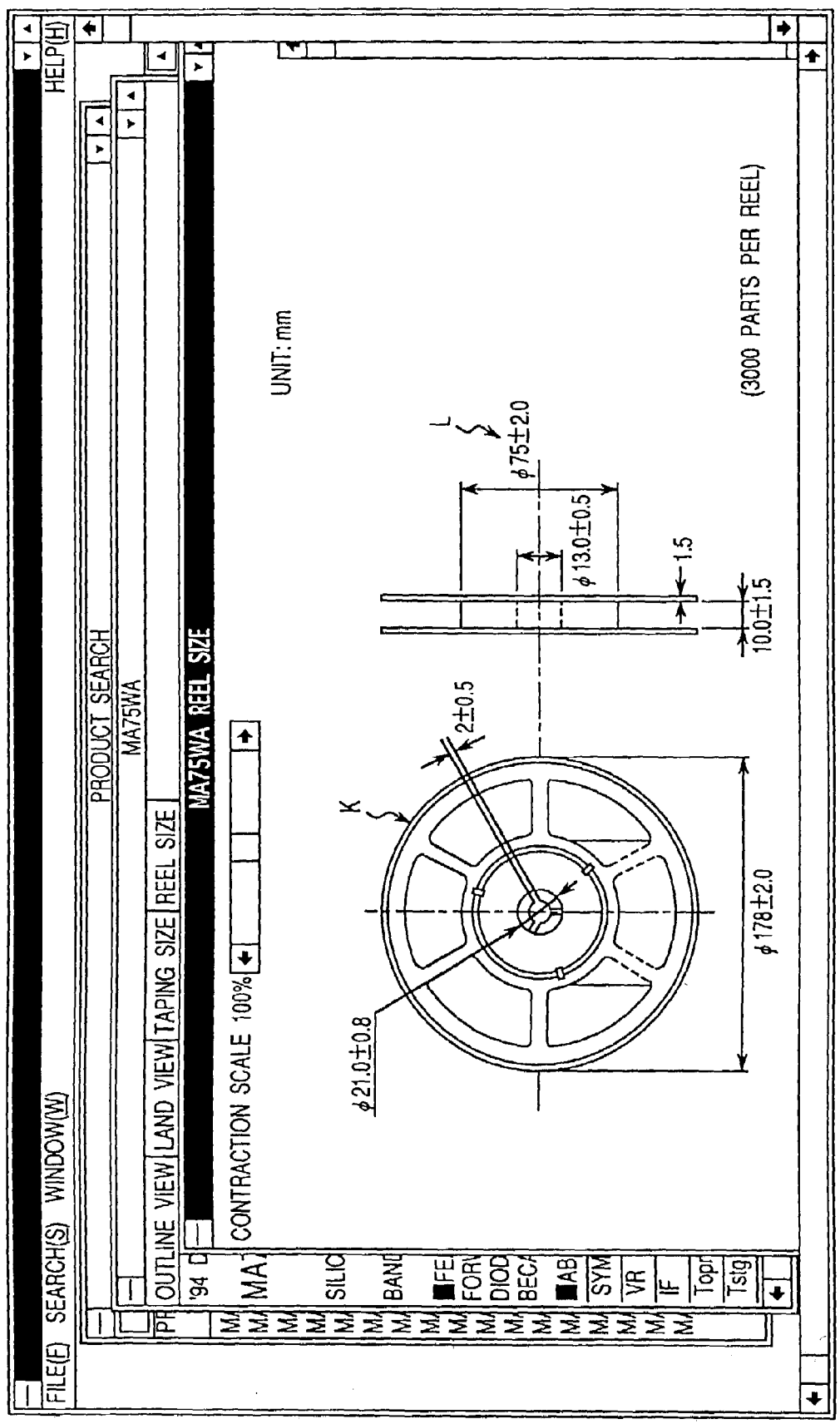
FIG. 19 is a screen showing a reel size of the rectifier diode due to the final search displayed on the screen of FIG. 14.

When a reel size is selected on the screen of FIG. 15, the image data IM and component text data B of a reel of the selected electronic component are read out from the storage medium 12 and combined to obtain a screen display as shown in FIG. 19. The screen shows a drawing K of the reel and component text data L corresponding to the dimension lines in the drawing K.

While mounting of the electronic components proceeds at the mounting apparatus 4 in accordance with the generated mounting data, it may happen that some of the electronic components are determined to need maintenance or are production-suspended components, which brings about the necessity of replacing the components with other electronic components. If the company lacks replacement components, interchangeable or compatible electronic components of other companies may be employed in some cases.

Therefore, it is preferred to store and manage data of replacement components corresponding to the components requiring maintenance or being suspended in their production, and also data of compatible components of other companies in a case where the replacement components are not available.

Figure 20:
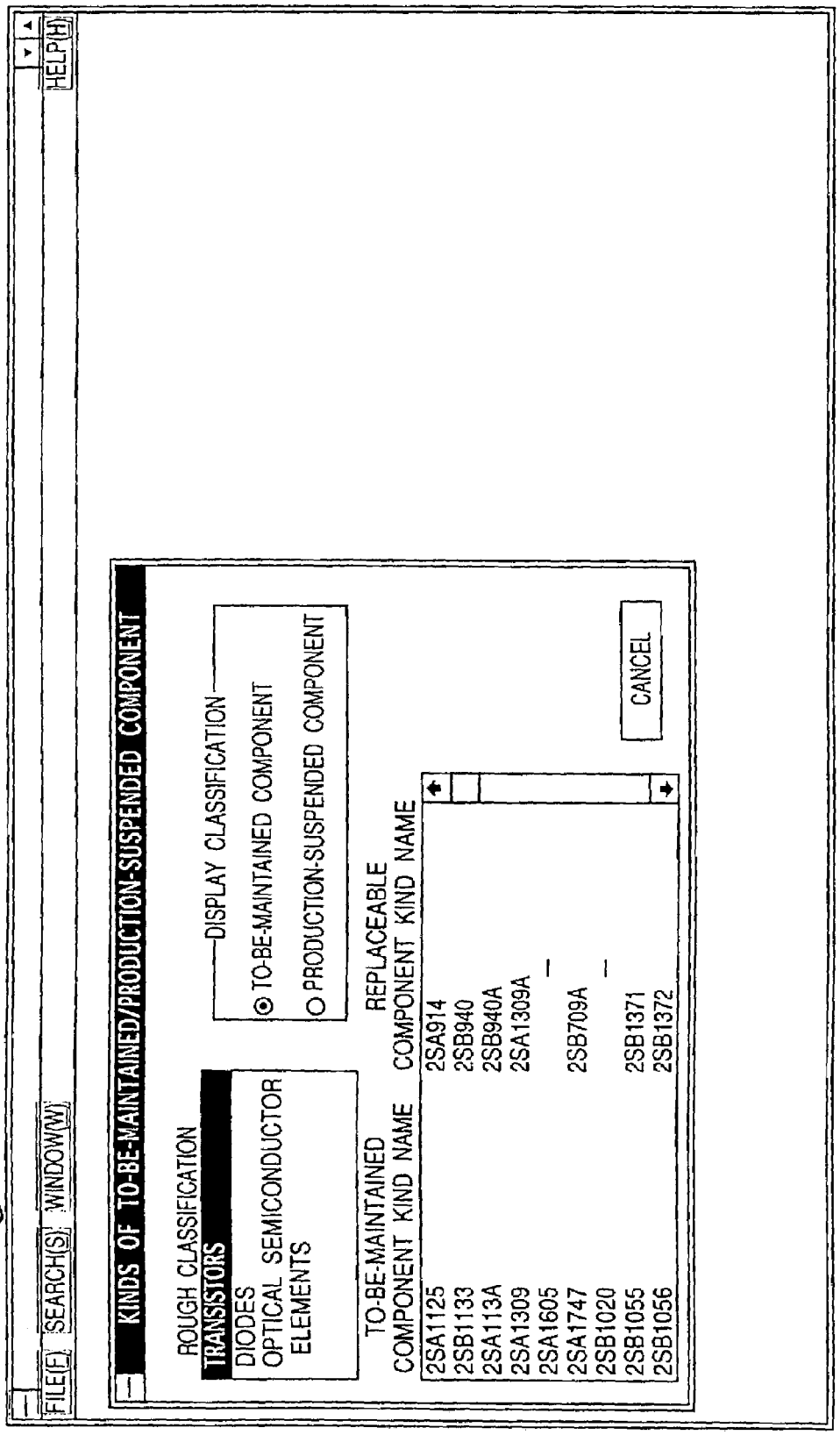
FIG. 20 is a screen showing a rough classification and a detailed classification of kinds of to-be-maintained and production-suspended components in the control system of FIG. 1 forming the mounting data.
Figure 21:
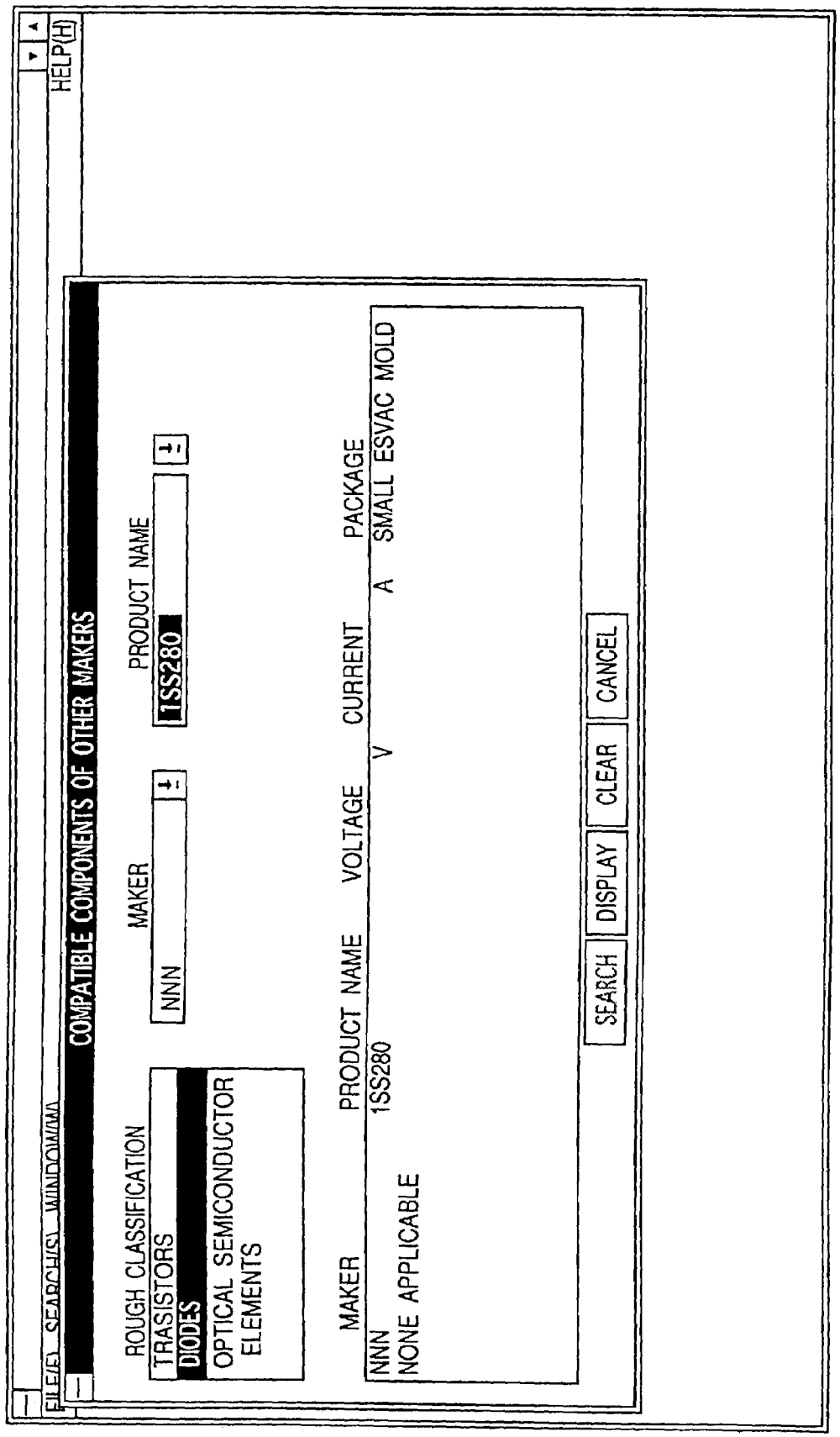
FIG. 21 is a screen showing a list of compatible components of other companies used in the control system of FIG. 1 forming the mounting data.

In the first embodiment of the present invention, comparative data of the to-be-maintained/production-suspended components and replacement components and of compatible components of other companies are similarly stored as the component text data B, to be searched while displayed on screens as shown in FIGS. 20 and 21.

If the component text data B are designed to include data of component shapes, electric capacities, characteristics, characteristics of mounting apparatuses, plane graphs, replacement components, compatible components of other companies, and component costs, it can be automatically performed at the forming time of the mounting data C to detect the presence/absence of interference by adjacent components when mounted to the board and determine necessary insulation distances based on the data of component shapes, electric capacities, and characteristics as in the flow chart of FIG. 11, whereby the necessary minimum arrangement interval is set automatically and the optimum recommended land shape for the electronic component is set automatically.

Data grouping-processing for determining the mounting order and arrangement to mount electronic components more quickly can be executed as well if data of the characteristics of mounting apparatuses and plane graphs are utilized.

Further, when data of replacement components, compatible components of other companies, and costs are included, data processing to select and mount components of the lowest cost is achieved. In addition, if the replacement components or compatible components are different from original components in shape or color, the components would be recognized as improper at the mounting time, that is, an error treatment would be started. To avoid such a disadvantage, a process for rewriting inspection data for forming inspection programs along with the mounting data can be automatically executed.

If the component text data B includes codes representing shape features, e.g., a state that connection bumps at the lower face of the component are projected, etc., the mounting heights, the pressing amounts, or the pressing pressures when the component is mounted to the board according to the mounting data forming program can be automatically determined.

If the component text data B includes, as numerical value data, shapes and dimensions of components, colors and hue, reflectivities, the presence/absence and states of leads and cut leads, polarity marks, printed characters on the components such as 1005CR, 10Ω or the like, color codes, surface roughness, and surface materials, it can be automatically determined from the shape and dimensions of the component whether the component is to be recognized at the mounting time by a reflection method or by a transmission method. More specifically, although a large-size component is easy to correctly recognize because it is reflected clearly even by the transmission method, a small-size component is not fit for the transmission method because the shadow of a nozzle sucking the small component is reflected, hindering the recognition of the small component except for the outward shape thereof. Not only the outer shape, but leads at the lower surface of the small component can be recognized in the reflection method, and moreover it does not obstruct the recognition even if a nozzle of a large diameter is used to mount the small component. Therefore, the transmission method is employed for large electronic components, while the reflection method is used for small electronic components, to thereby prevent inspection failures.

The amount and the type of illumination light for recognizing the components can be automatically changed from the data of colors and hue, reflectivities, surface roughness, and surface materials. A mirror surface has a high luminance and therefore cannot be recognized due to reflecting light if an intense light is cast thereto. If the surface of the component is dark, the component cannot be recognized with a weak light. The kind and amount of illumination light are changed optimumly in accordance with the surface state of the component.

The mounting direction of the component is confirmed and corrected from the presence/absence and states of leads and cut leads and polarity marks. Besides, the mounting component is confirmed from the printed characters and color code, etc. on, the component. Improper components are thus automatically refrained from being mounted.

If the component text data B includes data of a plurality of packing forms acceptable in components of the same kind, when the mounting data is to be formed, available supply methods or supply methods making the mounting cycle shortest can be automatically determined in accordance with the model or capability of a component feed mechanism from the plurality of packing form data, e.g., tapings, trays, stocks and the like and characteristic data of mounting apparatuses.

When each component feed cassette for every kind of electronic component loaded in the mounting apparatus has a memory for management of the cassette and component and the memory can be used, if shape codes indicating dimensions, colors, and polarities of components and feed codes of packing forms, feed pitches, and feeding directions, etc. are written in the memory, whether the component and the cassette correspond to each other can be detected when the component is set to the cassette, thereby preventing erroneous setting.

When the whole data of various kinds of electronic components stored in the memory of each component feed cassette are read out at the control system of the mounting apparatus loading the cassette, the component mounting data C covering the read components can be generated in accordance with the mounting data forming program fed to the control system, and the components can be mounted with the use of the mounting data C. A special control system or data file is eliminated by the above.

If the component text data B includes shape data such as data of lengths, widths, and heights of components, the volumes or weights of components can be calculated from the shape data, nozzles and chucks for handling the components can be selected based on the obtained data of the volumes or weights, the moving speed of the head equipped with the nozzles and chucks can be set, the moving speed of the table, particularly the acceleration of the table can be set, and various kinds of allowances can all be set automatically.

Further, if package color codes, component shapes, recommended land shapes of components, surface materials of components, surface reflectivities thereof (reflectivities for every portion of the component if reflectivities are different at both end portions of the component and a central portion of the component), polarity marks, printed characters or color codes on the surfaces of components, etc. are included in the component text data B, the inspection program for inspecting various mounted components can be automatically generated corresponding to components of the mounting data.

It becomes consequently unnecessary to select and set electronic components meeting the needs, different from when the mounting data are formed. Kinds of components and inspection data for every kind are obtained by simulating the component mounting data.

When the component text data B includes component shapes, especially lengths, widths, and heights, and information about leads, lead data required for visual inspection can be automatically set in the inspection program based on the component text data B. When the component text data B includes temperature characteristics of all the electronic components to be mounted to the same board, a process to set temperature conditions at mounting time can be automatically carried out by the component mounting data forming program. That is, specifically, in the case where electronic components are mounted at both surfaces of the board, the electronic components of higher heat-proof properties are set to be mounted at a first surface than at a second surface of the board which is processed after the first surface.

If the electronic components of higher heat-proof properties mounted to the first surface of the board are bonded by reflow soldering at a high melting point, and the electronic components of lower heat-proof properties mounted to the second surface are bonded by reflow soldering at a low melting point, it is eventually prevented that the electronic components mounted earlier to the first surface drop subsequent to melting of the solder when the electronic components mounted to the second surface are soldered, or the electronic components of lower heat-proof properties are damaged when mounted and soldered at the second surface.

If the component text data includes data as to whether components are moisture-absorptive thereby requiring burning or cold storage, conditions regarding how to treat the components at the mounting time can be automatically set along with the mounting data.

Figure 22B:
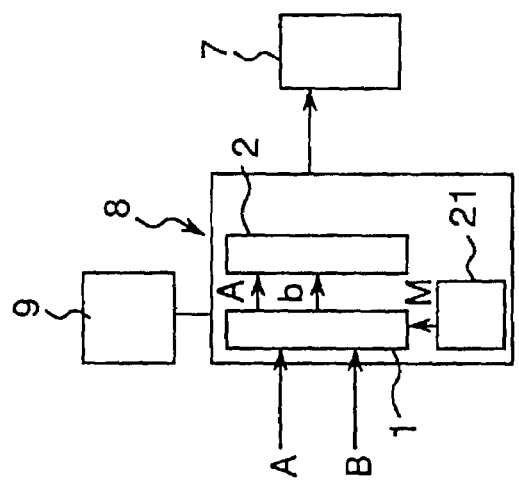
FIGS. 22A and 22B show diagrams of a different control system adapted to form mounting data from a component electronic catalog similar to that of the first embodiment, according to a second embodiment of the present invention, and a data processor thereof.
Figure 22A:
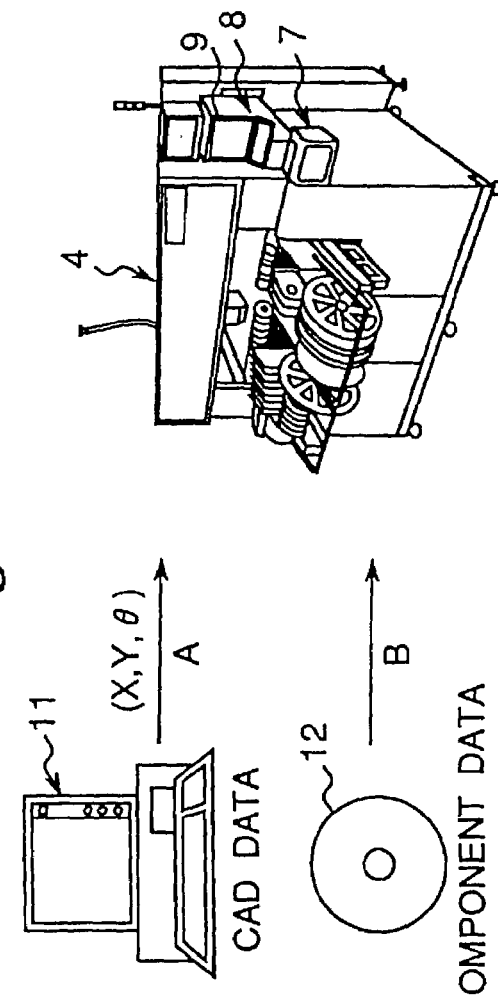
Figure 23:
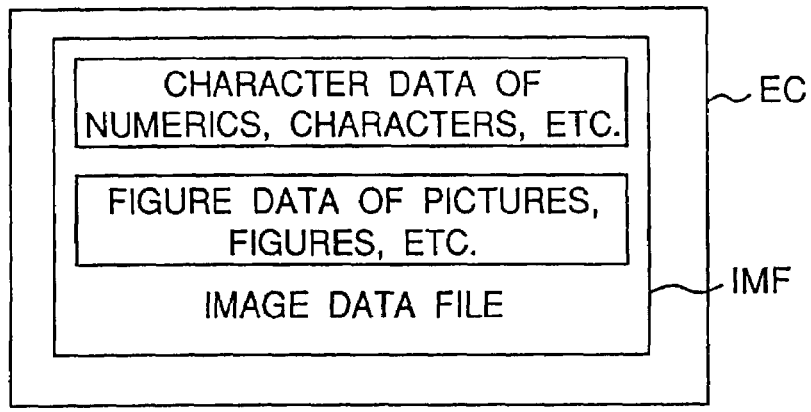
FIG. 23 is a block diagram of an example of contents stored in a conventional component electronic catalog.
Figure 24:
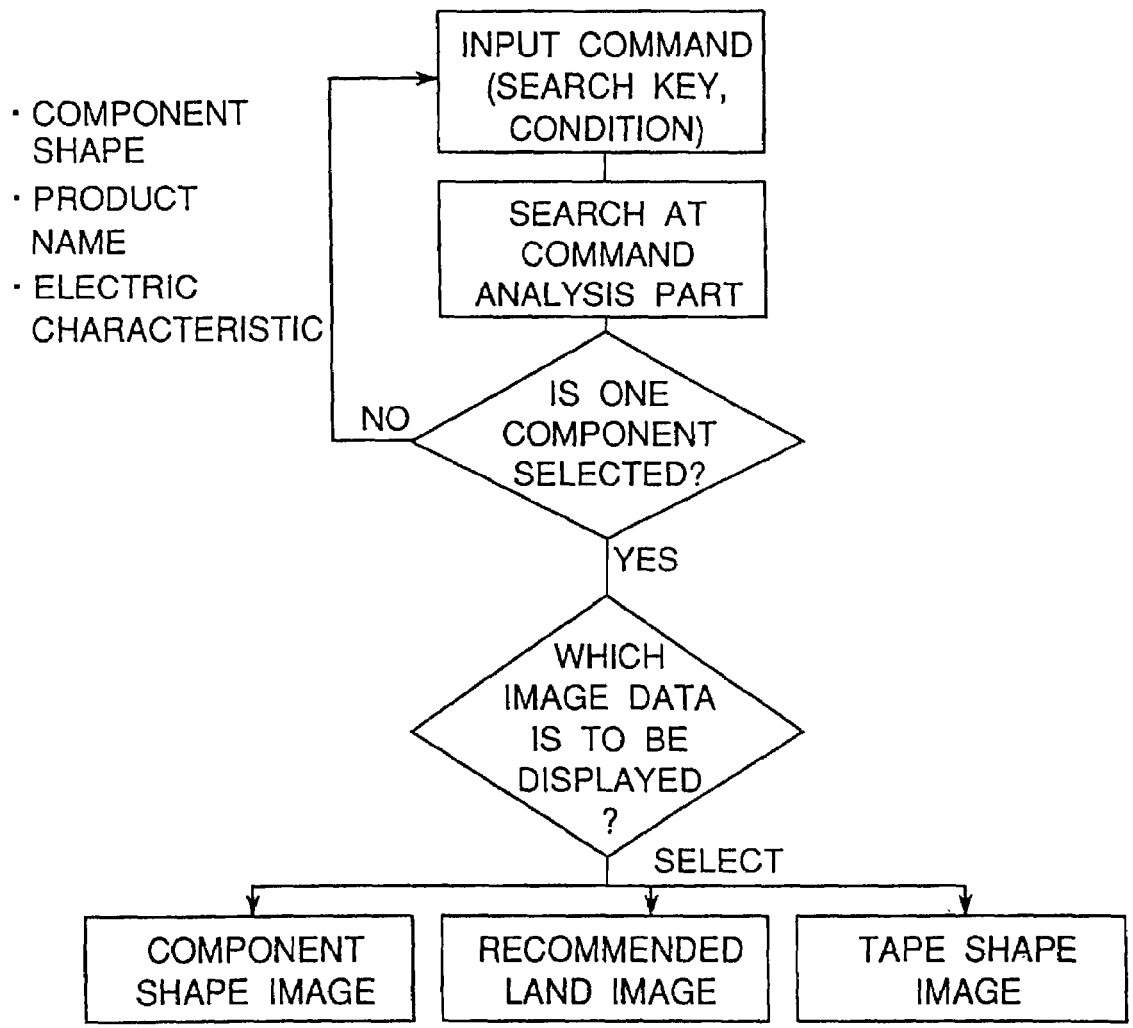
FIG. 24 is a flow chart of a conventional method for forming mounting data.
Figure 27:
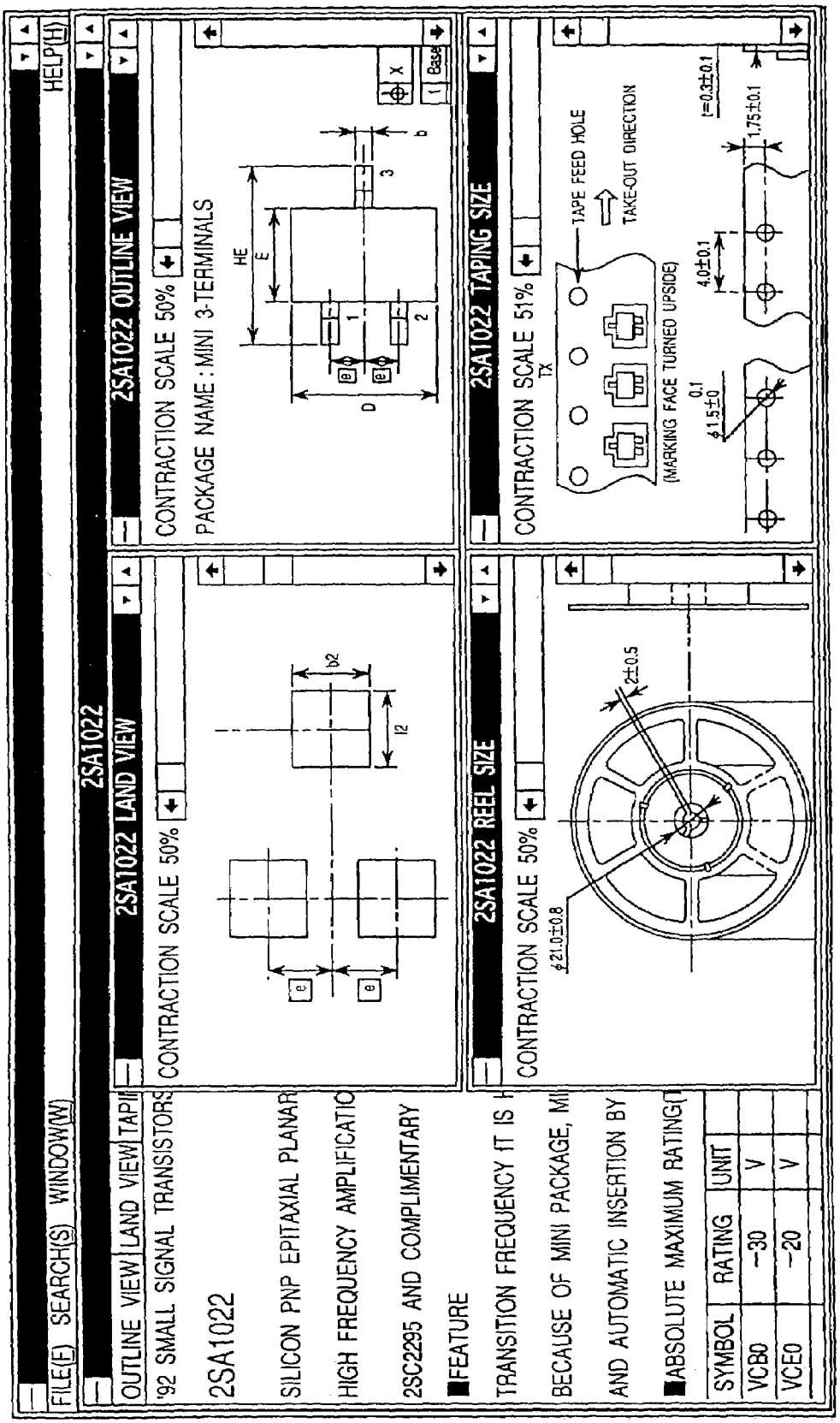
FIG. 27 is a window display screen showing a list of display items in the rough classification of the transistor displayed in FIG. 25 and selectable on the screen of FIG. 25.
Figure 28:
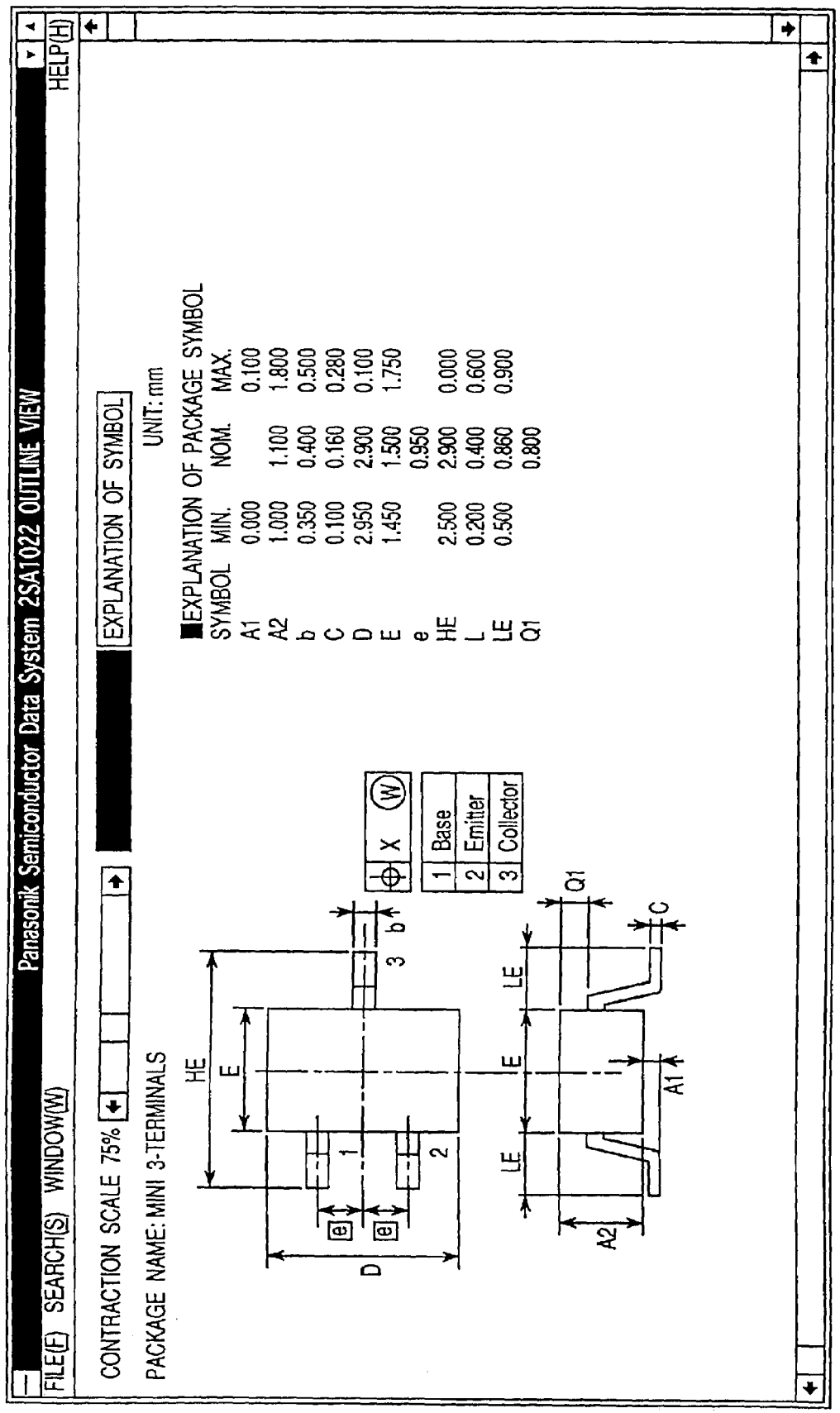
FIG. 28 is a display screen of an outline view of the transistor selected on the screen of FIG. 25.
Figure 29:
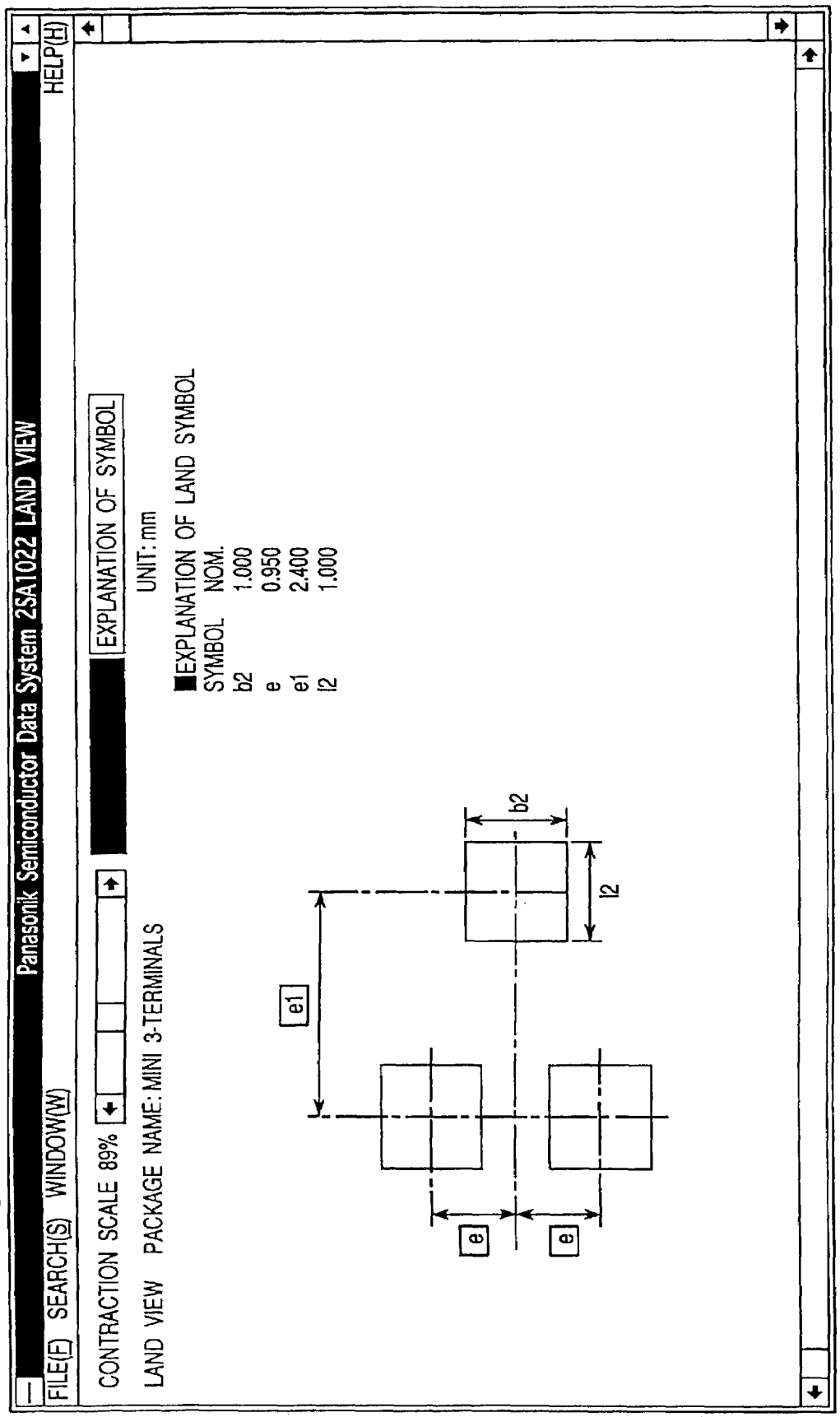
FIG. 29 is a display screen of lands of the transistor selected on the screen of FIG. 25.
Figure 30:
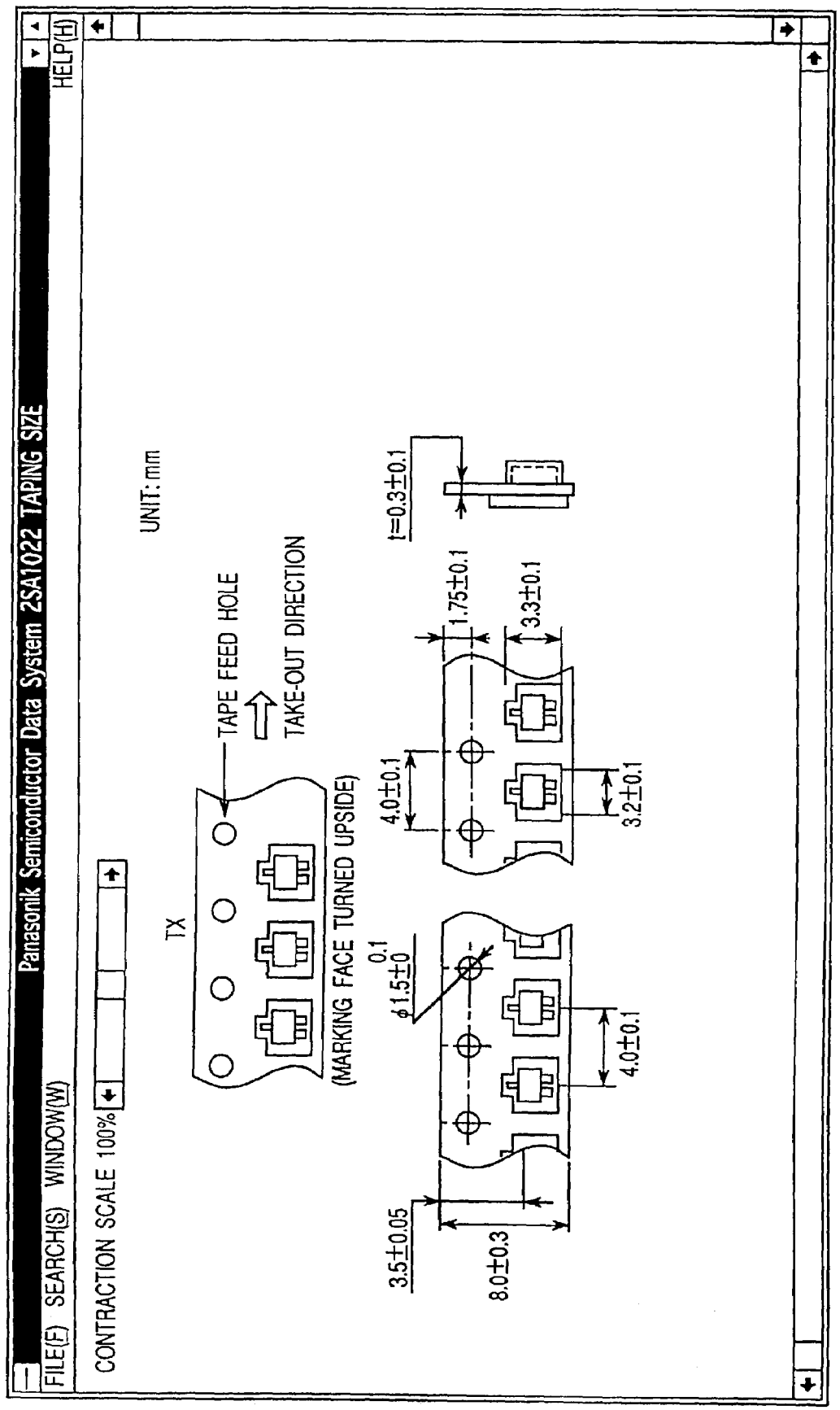
FIG. 30 is a display screen of a taping size of the transistor selected on the screen of FIG. 25.
Figure 31:
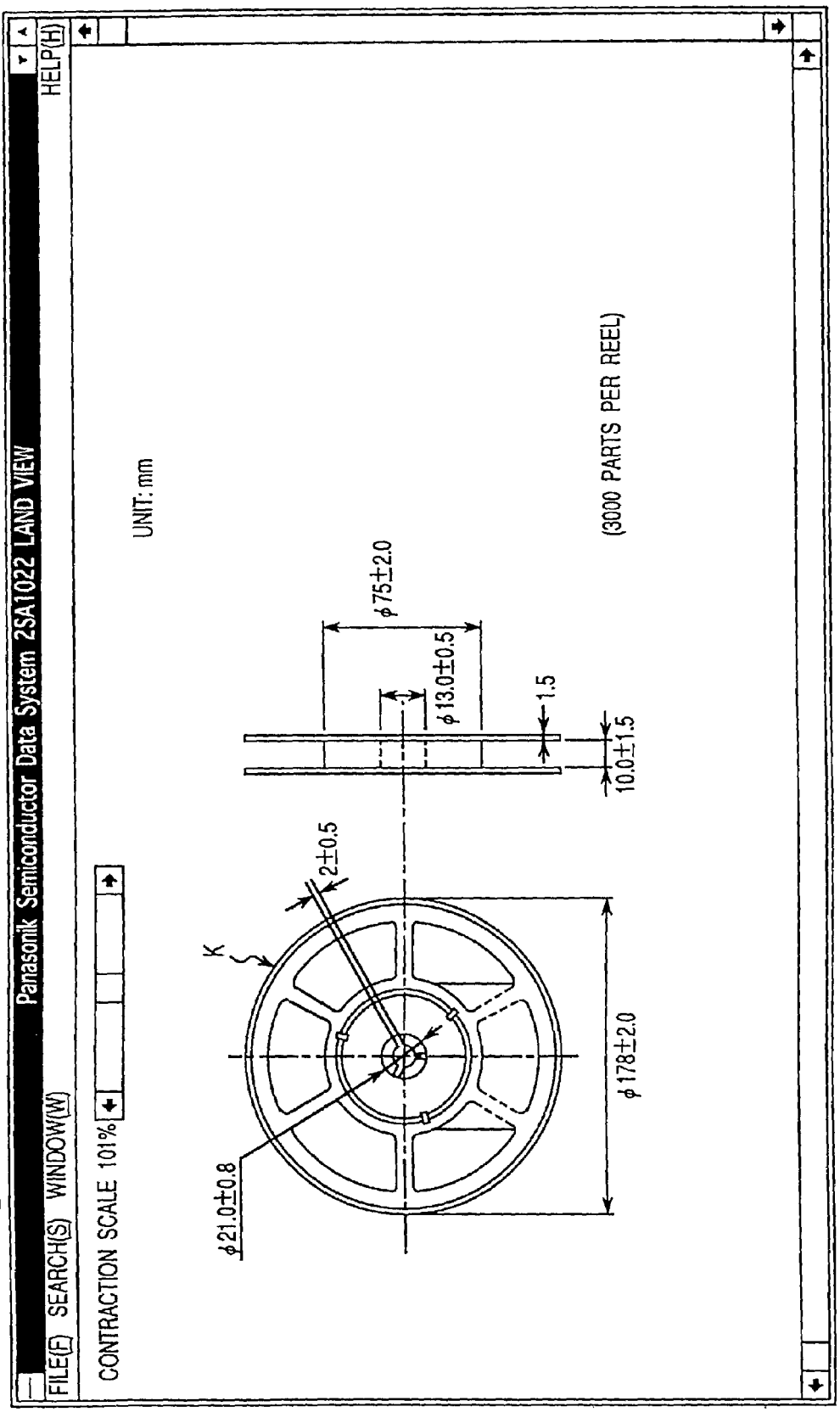
FIG. 31 is a display screen of a reel size of the transistor selected on the screen of FIG. 25.
Figure 32:
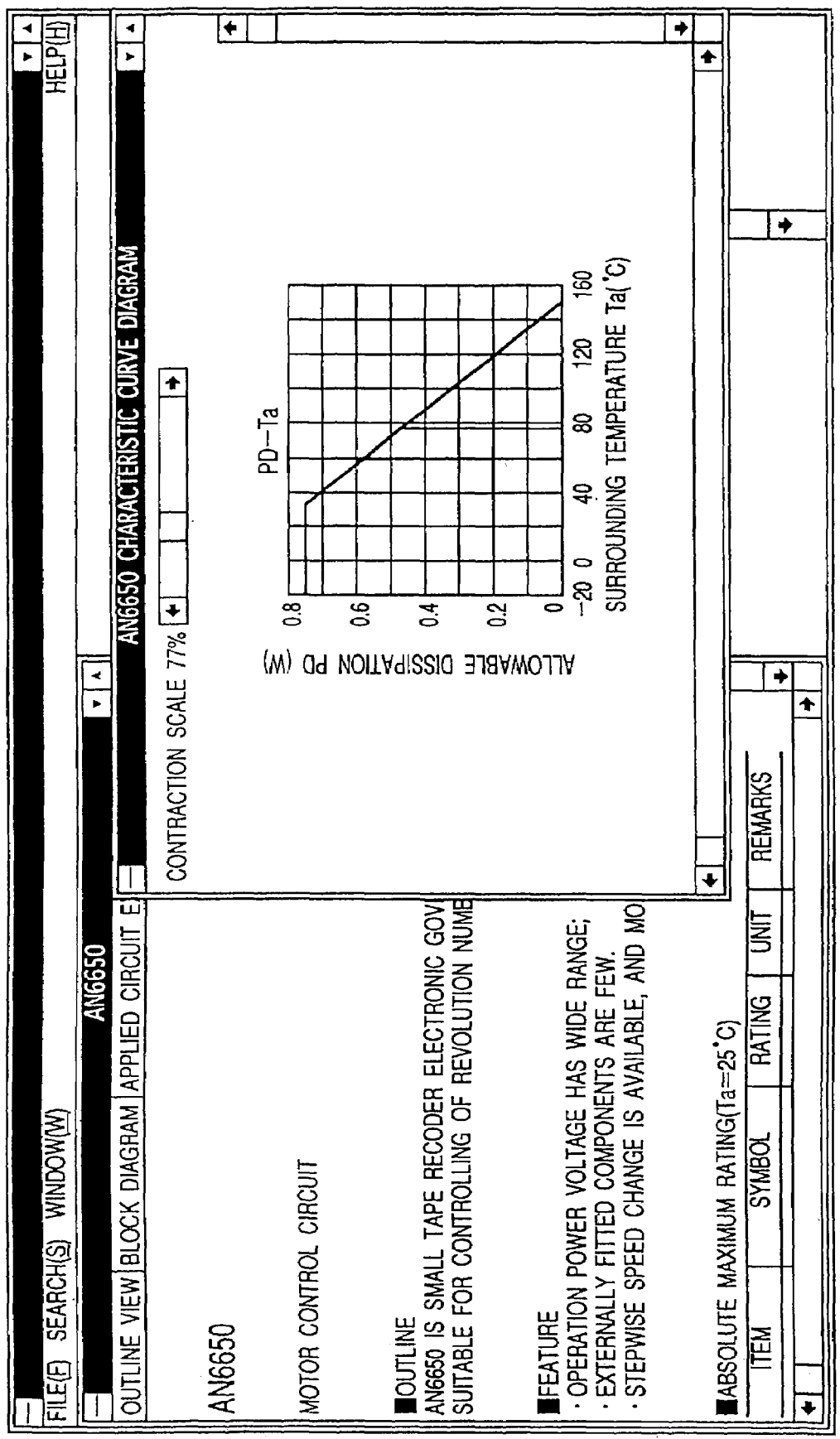
FIG. 32 is a window display screen showing data related to a characteristic curve as the characteristic curve is selected on a initial explanation screen when a motor control circuit as a different electronic component is searched.
Figure 33:
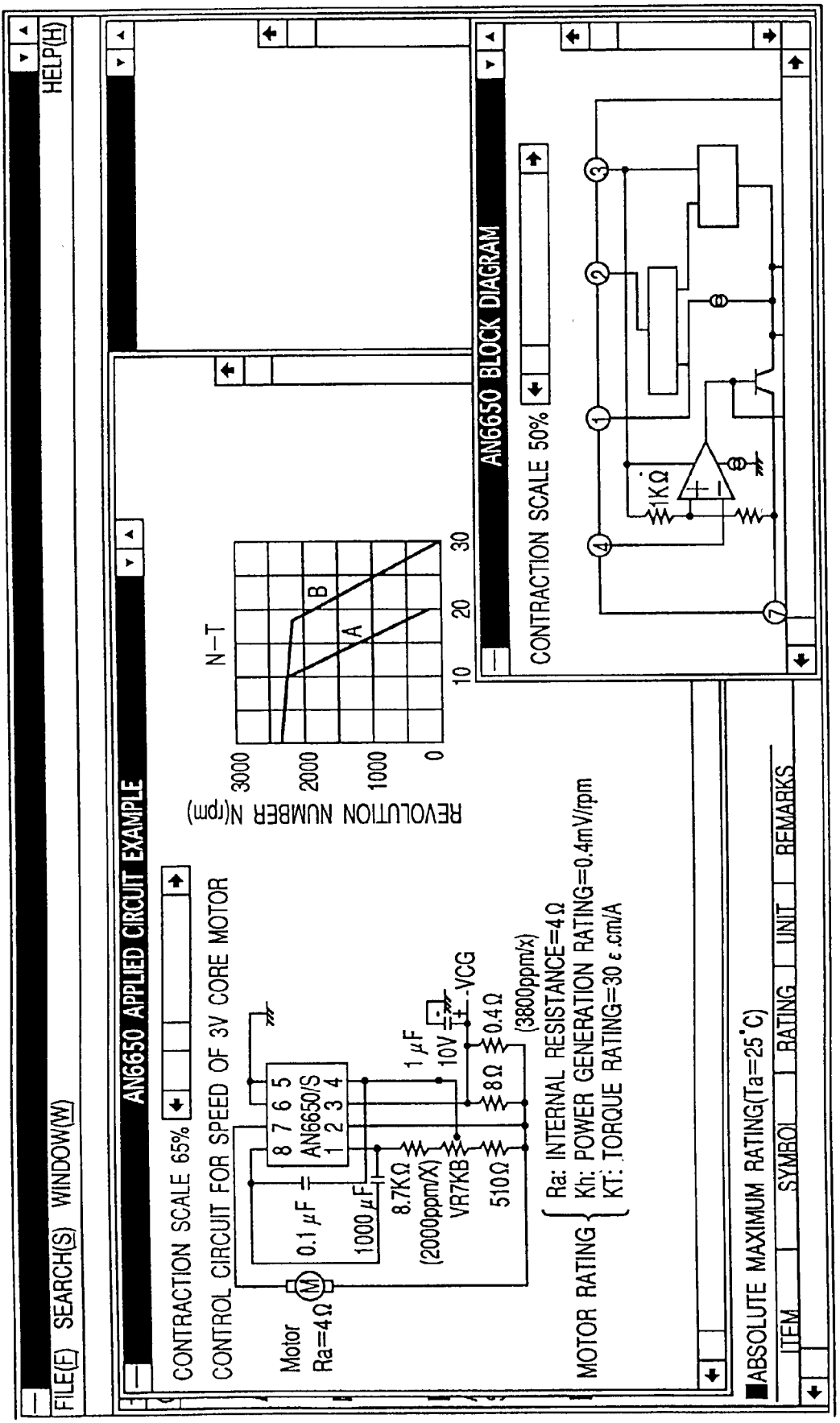
FIG. 33 shows not only a window display screen of an example of an applied circuit selected with priority on the initial explanation screen of FIG. 32, but a window display screen of a selected block diagram.

As shown in FIG. 22, a second embodiment of the present invention shows a case where automatic formation of component mounting data can be achieved from the component text data B stored in the storage medium 12 as the component electronic catalog by a simpler apparatus than the first embodiment. Specifically, the data processor 8 installed in the mounting apparatus 4 has functions of the data reading means 1 and the data forming means 2 incorporated thereinside. The data reading means 1 also reads out machine data M from a data file 21 storing characteristics of the mounting apparatus 4, thereby forming the mounting data C with the characteristics of the mounting apparatus 4 taken into consideration, using the mounting position data A and the component text data B stored in the storage medium 12 in the same manner as in the first embodiment.

Therefore, the obtained mounting data suit the characteristics of the mounting apparatus, in other words, more appropriate mounting of components can be realized. Since the data reading means 1 and the data forming means 2 constitute the data processor 8 of the mounting apparatus 4, no special data processor is needed between the CAD device 11 forming the mounting position data A and the data processor 8 of the mounting apparatus 4, thus reducing the number of devices to form the mounting data C. It is convenient that the mounting data C can be formed by the mounting apparatus 4 itself while including the characteristics of the mounting apparatus 4.

The component electronic catalogue can be used in various cases described below.

In another embodiment of the present invention, a case where the component electronic catalog is used for the component recognition operation for recognizing postures of components sucked by nozzles in mounting components is carried out as follows.

Figure 34:
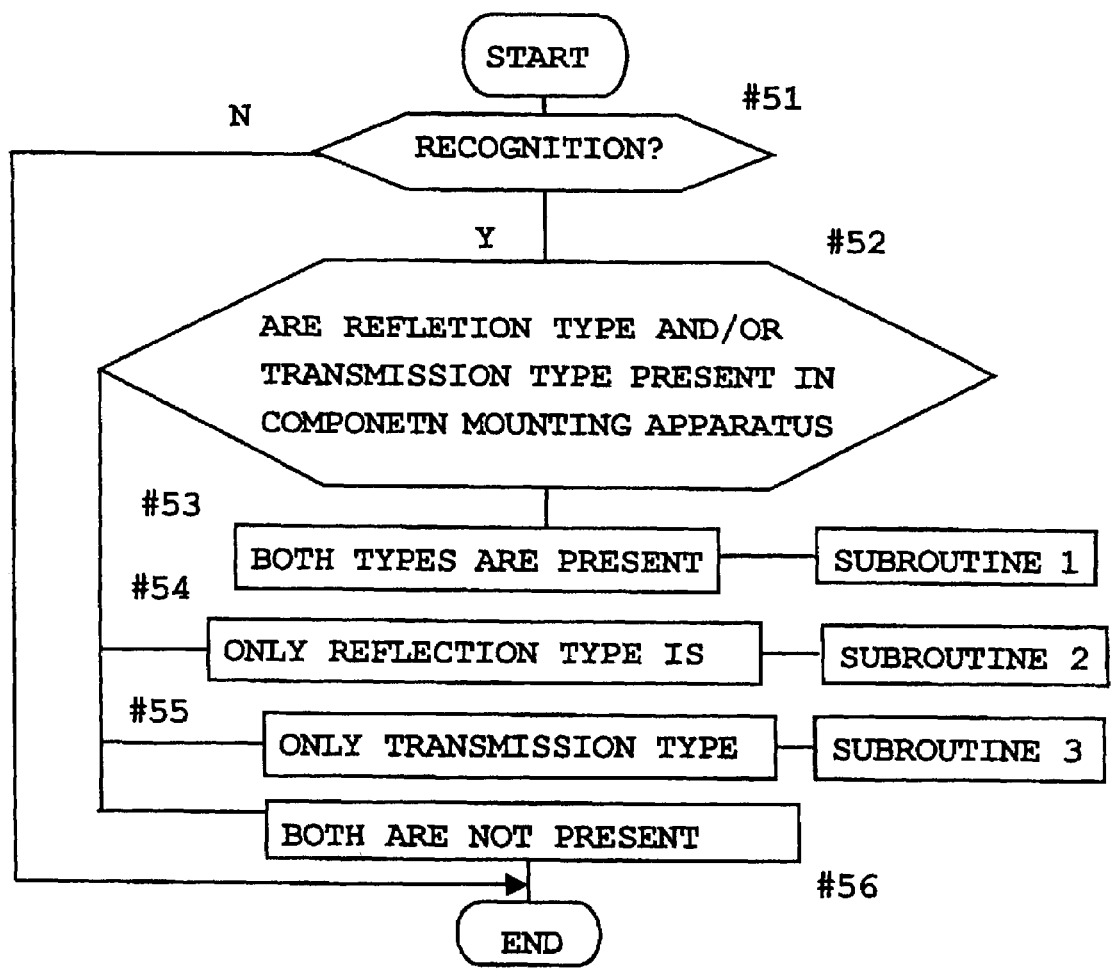
FIG. 34 is a flowchart for carrying out a component recognition operation while using data of the component electronic catalog.

At step #51 of FIG. 34, it is decided whether or not the component recognition operation is carried out. If yes, the program proceeds to step #52. If no, the following operations are not carried out and the program ends.

At step #52, it is decided whether or not the component mounting apparatus has a reflection type illumination device and/or a transmission type illuminating device. If the component mounting apparatus has both of the devices (step #53), the program proceeds to a recognition subroutine 1 described later. If the component mounting apparatus has only the reflection type illumination device (step #54), the program proceeds to a recognition subroutine 2 described later. If the component mounting apparatus has only the transmission type illumination device (step #55), the program proceeds to a recognition subroutine 3 described later. If the component mounting apparatus does not have both of the devices (step #56), the program ends.

The reflection type illumination device is used for recognizing postures of components with respect to the nozzle by illuminating the components from below the components and then receiving lights reflected by bottom surfaces of the components. The transmission type illuminating device is used for recognizing postures of components with respect to the nozzle by illuminating the components from above to below the components and then receiving lights passed through peripheries of the components.

Figure 35:
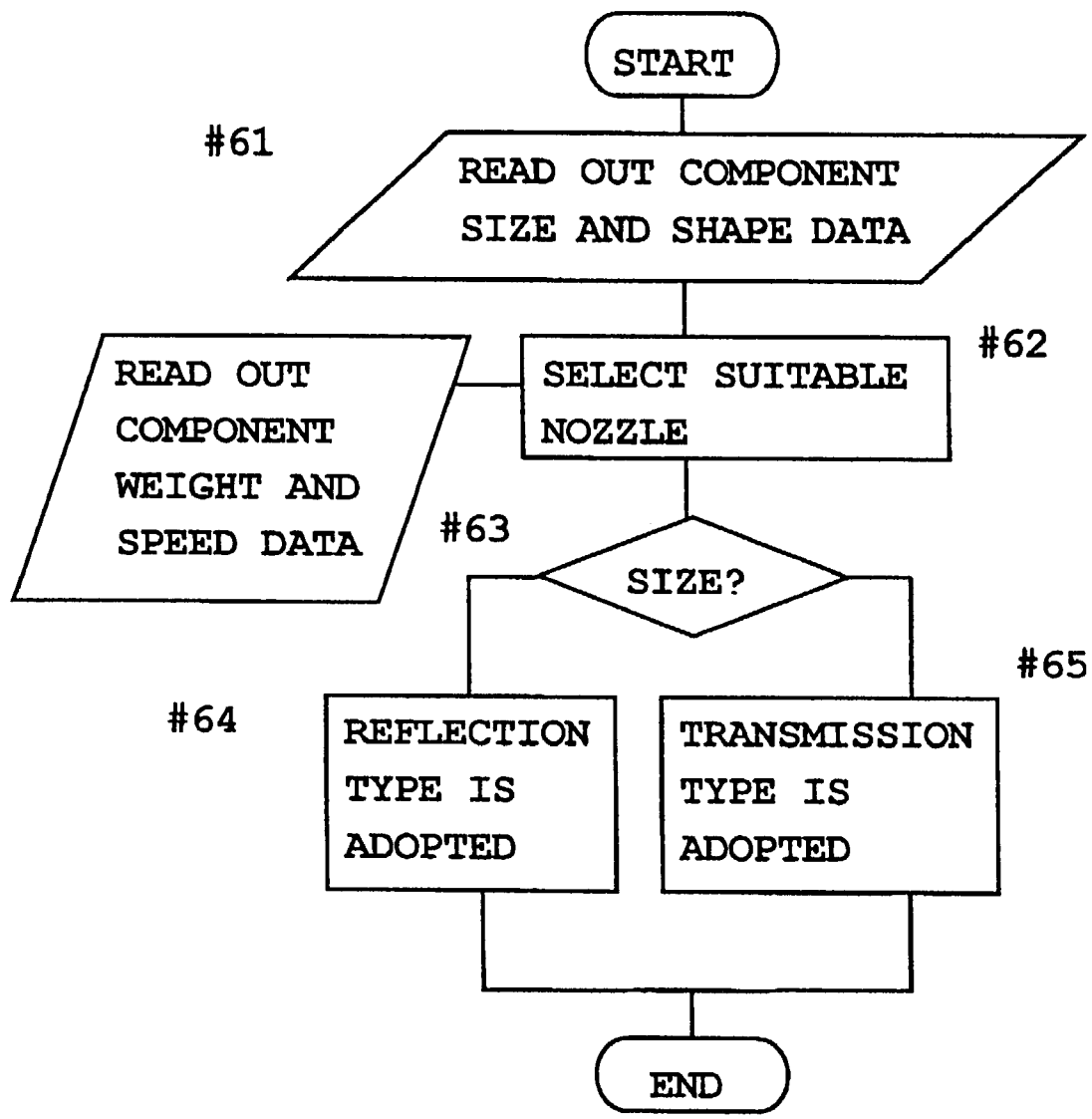
FIG. 35 is a flowchart of a subroutine 1 in the component recognition operation of FIG. 34.

The recognition subroutine 1 described above is as follows as shown in FIG. 35.

First, as step #61, sizes and shapes of components are read out from the component electronic catalogue to a recognition control device such as the controller of the component mounting apparatus.

Next, at step #62, weights and head moving speeds are further read out from the component electronic catalogue to the recognition control device. The nozzles suitable for components to be sucked are selected by the recognition control device based on the read-out weights and head moving speeds.

Next, at step #63, a size of a suction face of each of the nozzles is compared by the recognition control device with a dimension of the corresponding component to be sucked by the nozzle. If the size of the suction face of the nozzle is larger than the dimension of the corresponding component, the reflection type is adopted at step #64 by the recognition control device to carry out the component recognition operation. If the size of the suction face of the nozzle is smaller than the dimension of the corresponding component, the transmission type is adopted at step #65 by the recognition control device to carry out the component recognition operation.

Figure 36:
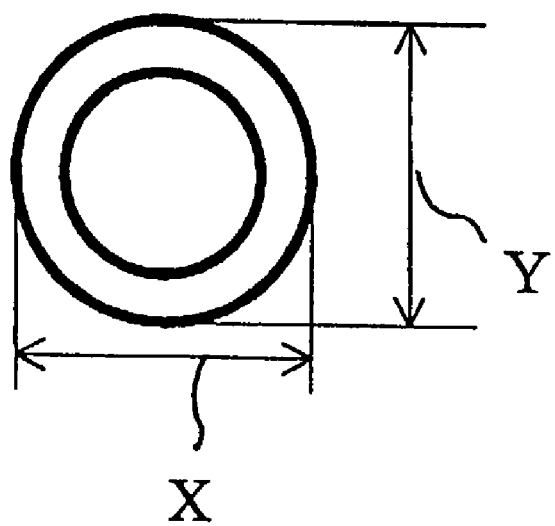
FIG. 36 is an explanatory view of a suction face of a nozzle in an XY-coordinate for the component recognition operation.
Figure 37:
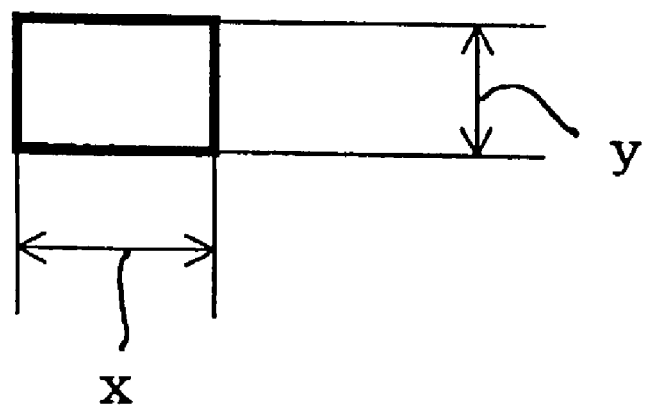
FIG. 37 is an explanatory view of a component in the XY-coordinate for the component recognition operation.

Here, a specified example at step #63 is described. As shown in FIGS. 36 and 37, the suction face of the nozzle and the component are expressed in an XY-coordinate. A dimension of the nozzle denotes "X" and a dimension of the component denotes "x" in X-axis. A dimension of the nozzle denotes "Y" and a dimension of the component denotes "y" in Y-axis. It is preferable that the component recognition operation is carried out while dividing into cases (a) to (c).
(a) If $X \leqq x$ and $Y \leqq y$, the transmission type is adopted at step #64 by the recognition control device to carry out the component recognition operation.
(b) If $X \leqq x$ or $Y \leqq y$, the transmission type or reflection type is adopted (for example, either one type is adopted in accordance with capacity of a recognition algorithm) at step #64 or #65 by the recognition control device to carry out the component recognition operation.
(c) If $X > x$ and $Y > y$, the reflection type is adopted at step #65 by the recognition control device to carry out the component recognition operation.

In the recognition subroutine 2, all of the cases (a) to (c) can be dealt with under the same condition and thus the component recognition operation is carried out by the recognition control device without taking into consideration with the nozzle selection.

In the recognition subroutine 3, it is necessary to select the nozzle so as to become in the cases (a) and (b). That is, after the nozzle smaller than the component is selected, the component recognition operation is carried out by the recognition control device.

Figure 38:
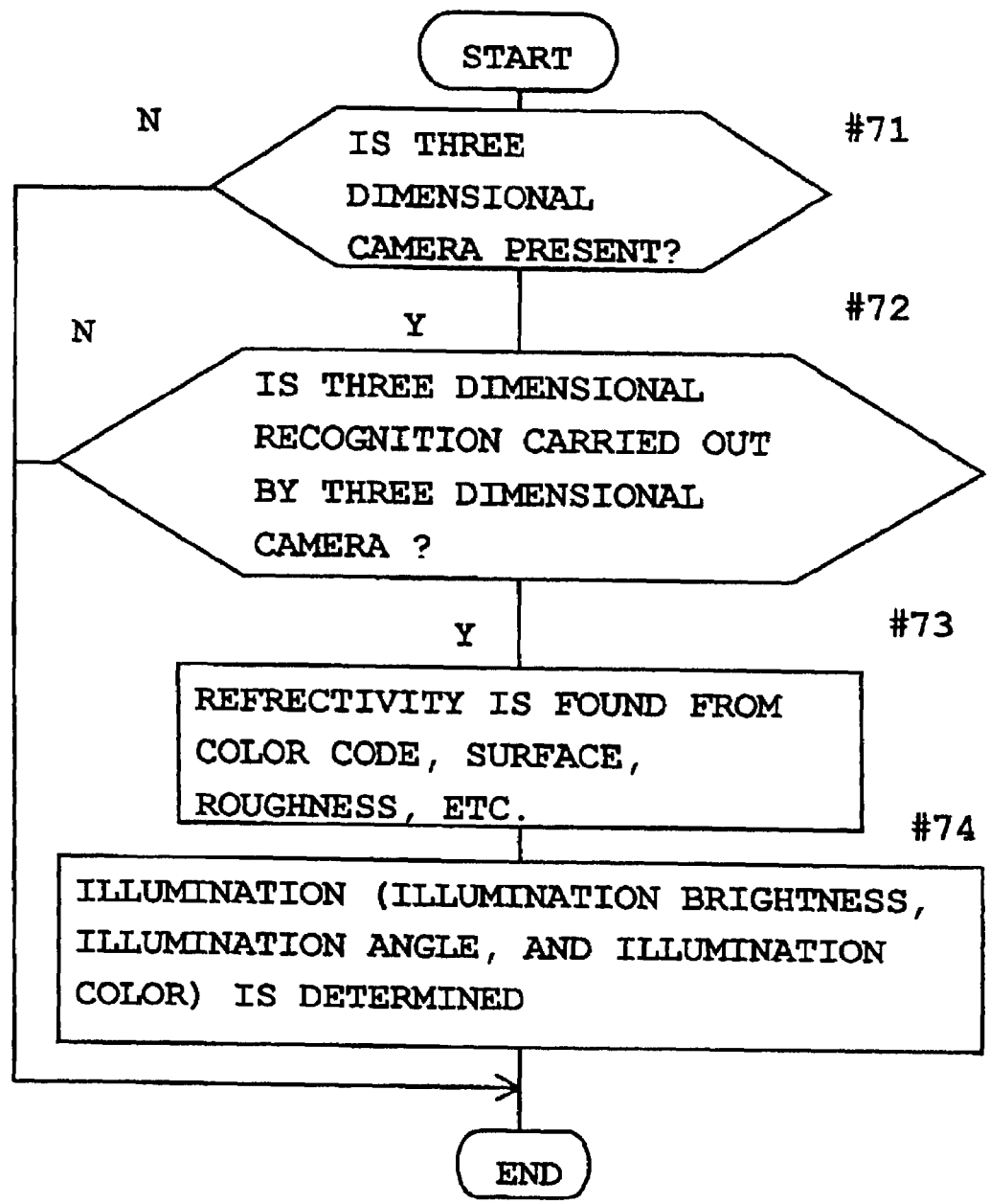
FIG. 38 is a flowchart of a subroutine which is carried out when a reflection type is selected in the subroutine 1 in the component recognition operation of FIG. 34.

When the reflection type is adopted to carry out the component recognition operation, a subroutine shown in FIG. 38 can be further carried out by the recognition control device as follows.

At step #71, it is decided by the recognition control device whether or not a three dimensional camera for three-dimensionally recognizing a component in addition to a two dimensional camera for two-dimensionally recognizing a component is present. When the three dimensional camera is present, the program proceeds to step #72. When the three dimensional camera is not present, the program ends.

At step #72, it is decided by the recognition control device whether or not a three dimensional recognition is carried out by the three dimensional camera. When the three dimensional recognition is carried out, the program proceeds to step #73. When the three dimensional recognition is not carried out, the program ends.

At step #73, when a component is illuminated by a reflection type illumination device, reflectivities of surfaces of the components are obtained from surface color codes, surface roughness of the components by the recognition control device.

Next, at step #74, illumination is determined by the recognition control device. That is, illumination brightness, illumination angle, and illumination color (either one of green, red, white, blue?) is determined by the recognition control device. Based on the result, illumination of components sucked by nozzles is carried out with the determined illumination brightness, illumination angle, and illumination color in the reflection type illumination device, to carry out the component recognition operation by the recognition control device.

In such a manner, an optimum condition for the reflection type component recognition operation is automatically obtained.

It is noted that a size of a component is larger than a suction hole of a nozzle in order not to suck the component into the suction hole of the component because the size of the component is smaller than the suction hole of the nozzle. The materials of packages of electronic components (for example, synthetic resins, ceramics, metals, or the like), surface roughnesses, surface shapes (abnormal shapes such as cases for high frequency components, connector covers, or the like), information of nozzle use or chuck use as component holding members, suction forces of nozzles, moving speeds and accelerations of the component mounting head may be stored in the component electronic catalogue. It is noted that polarity marks of components can be recognized by the reflection type recognition while lacks of components or lead lacks of components can be recognized by the transmission type recognition.

In such a manner, each of the reflection type illumination device and the transmission type illumination device can be suitably used resulting in accordance with components, resulting in reducing an error due to type selection error in the component recognition operation.

As a further embodiment of the present invention, a method of controlling the component mounting operation while using data of the component electronic catalogue is described.

First, shapes, data of dimensions, and weights of respective components are stored in the component electronic catalogue. In order to make the component mounting data,
(i) data of moving speeds and acceleration speeds of a mounting head equipped with the nozzles in the component mounting apparatus;
(ii) data of suction forces of the nozzles of the mounting head;
(iii) data of moving speeds of boards;
(iv) data of kinds of nozzles (information of components capable of being sucked by nozzles); and
(v) data of mounting heights of components on boards; are prepared.

Next, (I) data of weights of components are read out from the component electronic catalogue by a control device such as the controller of the component mounting apparatus.

Next, (II) the prepared data of the moving speeds and acceleration speeds are inputted to the control device. Next, an optimum speed is determined by the control device from the two inputs (I) and (II) to control the component mounting operation.

As a further embodiment of the present invention, the component electronic catalogue is used to transfer mounting data between factories.

Figure 39:
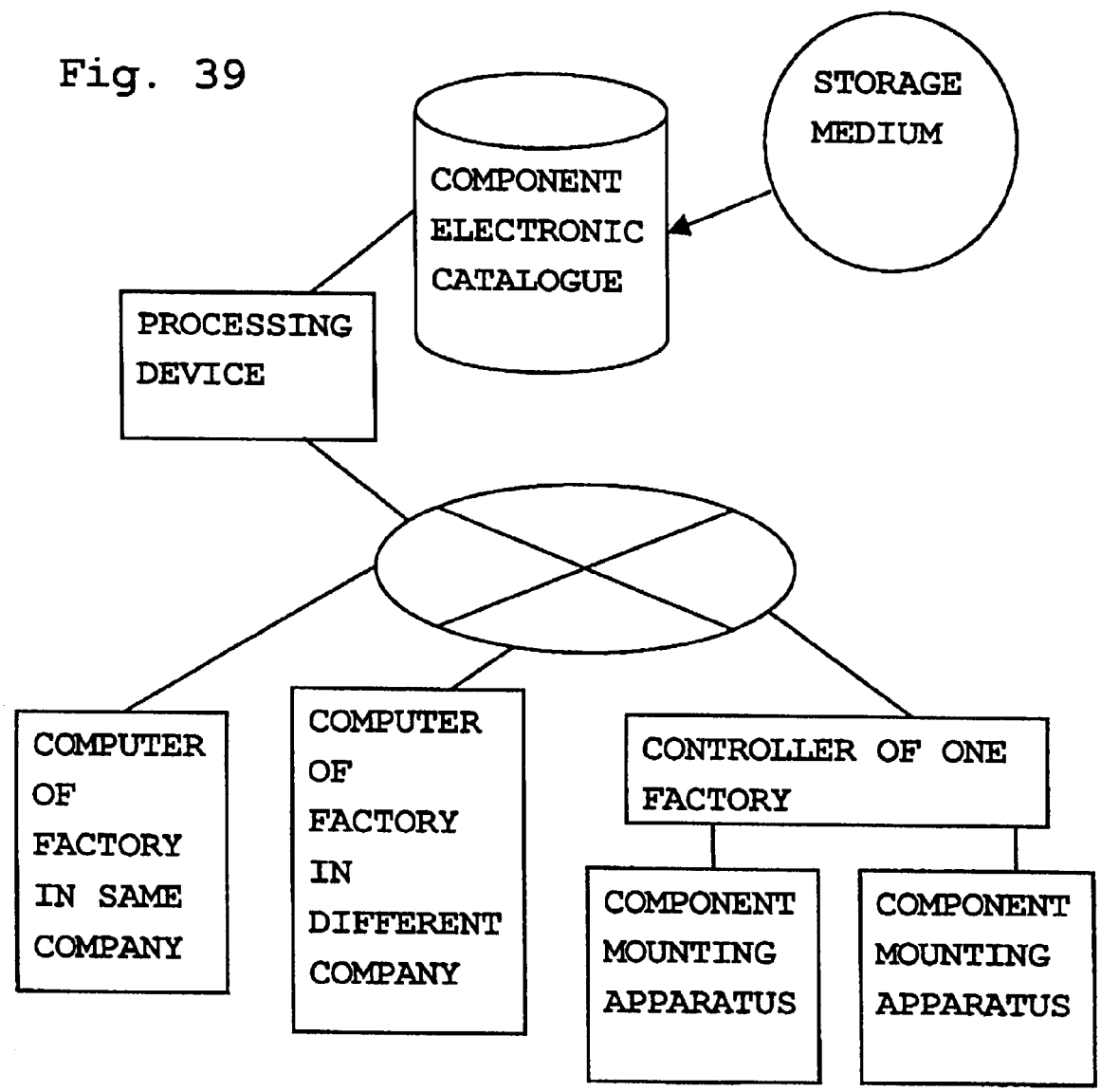
FIG. 39 is an explanatory view showing a case where mounting data is transferred between factories while using data of the component electronic catalog.

As shown in FIG. 39, the data of the component electronic catalog is stored in a database to which various information such as component costs and delivery dates of components provided by sales companies and component manufacturing makers is inputted through storage mediums or network. Through network, computers of factories of the same company, computers of factories of different companies, a controller for controlling plural electronic component mounting apparatuses in one factory of the company, or the like can be easily connected to the database.

The data of the component electronic catalog can be outputted to devices on the downstream side such as the above computers or controller to make mounting data based on the data of the component electronic catalog. Alternately, after mounting data is made based on the data of the component electronic catalog, the made mounting data can be outputted to devices on the downstream side such as the above computers or controller. Based on such mounting data, components are mounted on boards by the component mounting apparatuses.

Next, as a further embodiment of the present invention, a case where component-mounted boards are produced by one or plural component mounting apparatuses while using a database 1000 storing the component electronic catalog is described as below. Here, (1) a case of an order inquiry before an order in producing component-mounted boards, and (2) a case of an order where a delivery date has been determined are described. The both cases have different processes at only the step 25.

A processing device for carrying out a preparing operation for production of component-mounted boards includes a control device, an input device such as a keyboard and a mouse, and an output device such as a display and/or printer.

There are two methods of forming a database for storing data of the component electronic catalog and data of component prices and delivery dates:
(1) There are different databases for storing data of the component electronic catalog and data of component prices and delivery dates.
(2) There is a database for storing data of the component electronic catalog and data of component prices and delivery dates as support data.

Figure 40:
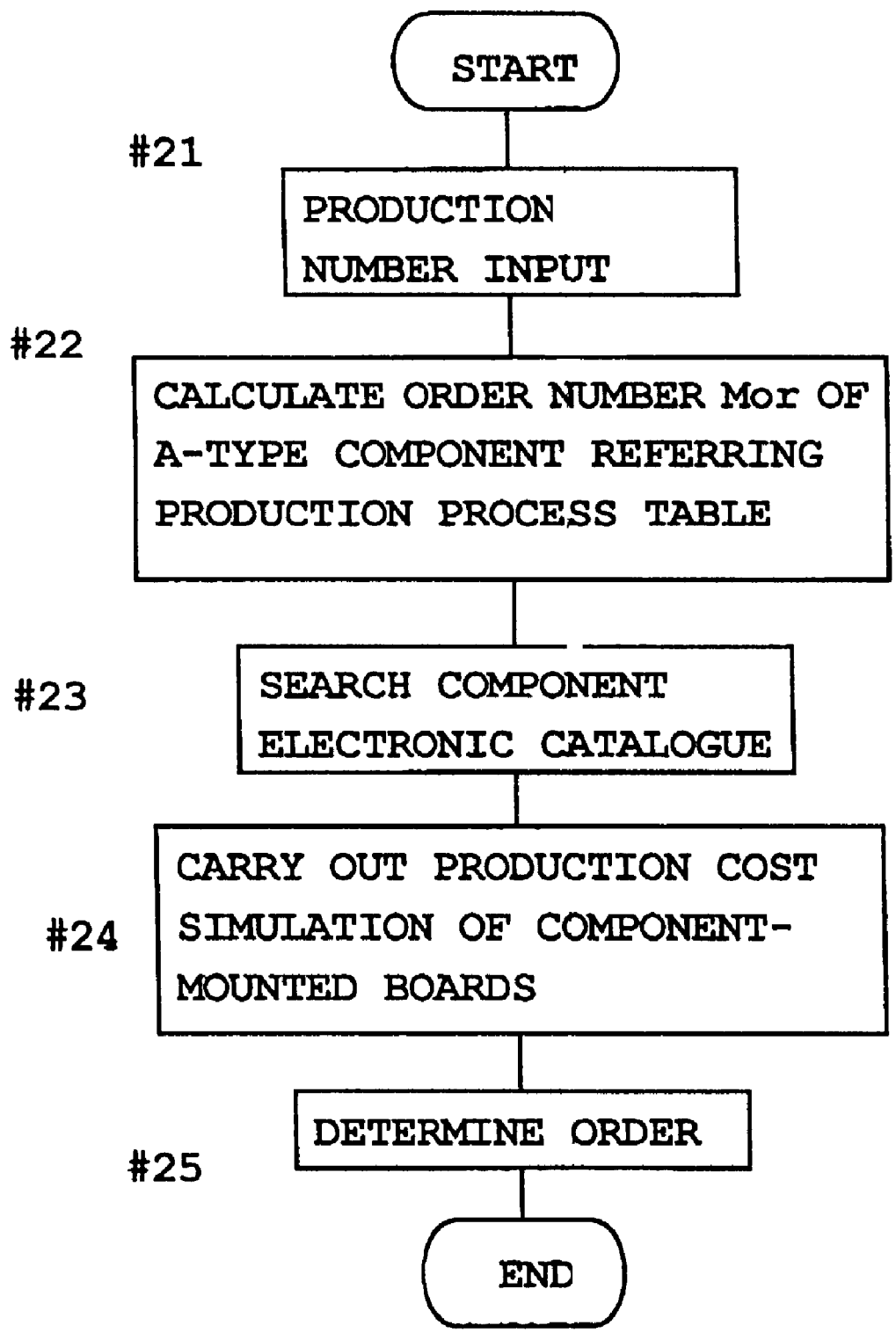
FIG. 40 is an explanatory view showing a case where component-mounted circuit boards are produced while using data of the component electronic catalog.

As shown in FIG. 40, at step #21, production numbers are inputted to the order processing device.

At step #22, a necessary number of A-type components is calculated from a number of the A-type components per component-mounted board and a number of component-mounted boards to be produced by the order processing device to find an order number of the A-type components Mor. That is, referring the production process tables, the total necessary number of the A-type components TN is found by adding the necessary numbers of the A-type components through production processes to each other and then the order number of the A-type components Mor is found by subtracting a stock number of the A-type components 5N from the total necessary number of the A-type components TN. One example of the production processes for component-mounted boards is as follows:

Production Process 1
(i) 100 A-type components and 200 B-type components are necessary for one board through component mounting operation and a production number of the boards is 100.

(ii) 250 A-type components and 150 B-type components are necessary for one board through component mounting operation and a production number of the boards is 200.

Production Process 2
 (i) 300 A-type components and 400 B-type components are necessary for one board through component mounting operation and a production number of the boards is 100.
 (ii) 350 A-type components and 550 B-type components are necessary for one board through component mounting operation and a production number of the boards is 400.

So, the total necessary number of the A-type components TN is
(100×100)+(250×200)+(300×100)+(350×400)=230000.
Then, the stock number of the A-type components SN is obtained through search of the database and then, the order number Mor is found by subtracting the stock number SN from the total necessary number of the A-type components TN, that is, Mor=TN−SN. For example, if the stock number SN is 100000, Mor=SN−TN=230000−100000=130000. That is, the order number Mor is 130000.

At step #23, the component electronic catalogue in the database is searched through the network to obtain the component costs and delivery dates of the A-type components.

In this time, it is preferable that after the component electronic catalogue in the database is searched through the network to obtain the component costs and delivery dates of the A-type components, the most cheaper components within acceptable delivery dates of the A-type components with respect to quality, characteristic, and the like of the A-type components in the obtained information are firstly shown together with their manufacturing maker name(s) and other information in the display, and the most expensive components are latter together with their manufacturing maker name(s) and other information. It is easy to determine how to get the A-type components to be ordered in this manner.

At step #24, based on the data of the production number, costs, and delivery dates, a production cost simulation of component-mounted boards is carried out using a computer. One example of the result is as follows:

<Production Cost Simulation of Component-mounted Boards>
 cost: XXX yen, delivery date: 30 days, numbers of components: four.
 cost: YYY yen, delivery date: 40 days, numbers of components: three.
 cost: ZZZ yen, delivery date: 50 days, numbers of components: three.

At step #25, it is determined whether or not the order is carried out based on the result of the production cost simulation. That is, (1) in a case of an order inquiry, the result of the production cost simulation is transmitted to a customer and then a decision is made by a customer side. (2) In a case of production delivery date decided, a decision is made in accordance with larger one of weight assigned to cost and weight assigned to delivery date based on the result of the production cost simulation.

According to this embodiment, the order inquiry or the order can be suitably processed while taking into consideration with the production process tables.

The component electronic catalog of the present invention is used as a storage medium so as to select various components to be mounted through the screen search, similar to the conventional art. In addition, the electronic catalog is used to automatically read out components text data necessary for mounting of the selected to-be-mounted components, so that the NC program related to the mounting position of components, the component library related to the recognition of components, e.g., shapes, dimensions, colors or the like of components, or the supply library related to the supplied states of components such as the arrangement of components at a component feed section or the like, i.e., mounting data for feeding the components to the mounting apparatus and mounting the components at a predetermined mounting position by the mounting apparatus can be automatically formed in the conventional automatic data processing manner. Since it is not necessary to manually input data of various components necessary for forming the mounting data for every component to be mounted, the electronic catalog greatly can reduce the labor and time required in the formation of the mounting data.

According to the component electronic catalog of the present invention, in addition to the above effect, various data can be input independently of the reading means and moreover changed or added easily. The electronic catalog is shareable among kinds of mounting apparatuses.

According to the component electronic catalog of the present invention, in addition to the above effect, one storage medium is utilized in common among many mounting apparatuses irrespective of the location of the mounting apparatuses, which is advantageous and convenient to form, manage, change, or add data.

The entire disclosure of Japanese Application No. 8-12132 filed on Jan. 26, 1996 including specification, claims, drawings, and summary is incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for performing a component recognition operation, the method comprising:
 while using a component electronic catalog storing component text data of a plurality of components to be mounted, the component text data including shapes, dimensions, and weights of the plurality of components,
 selecting one of the plurality of components from the component electronic catalog;
 reading out from the catalog the component text data corresponding to the selected component;
 selecting one of a plurality of nozzles for sucking the selected component based on component text data read from the catalog corresponding to the selected component; and
 comparing a size of a suction face of the selected nozzle with a dimension of the selected component to be sucked by the selected nozzle,
 wherein, if the size of the suction face of the selected nozzle is larger than the dimension of the selected component, then performing a reflection type of component recognition operation for recognizing a posture of the selected component to be sucked by the selected nozzle with respect to the selected nozzle by illuminating the selected component from below the selected component and then receiving a light reflected by a bottom surface of the selected component, and wherein, if the size of the suction face of the selected nozzle is smaller than the dimension of the selected component, then performing a transmission type of component recognition operation for recognizing a posture of the selected component to be sucked by the selected nozzle with respect to the selected nozzle by illuminating the selected component from above to below the selected component and then receiving a light passed through a periphery of the selected component.

2. A method for performing a component recognition operation, the method comprising:

deciding whether or not a component mounting apparatus has a reflection type illumination device and/or a transmission type illuminating device;

wherein, if said deciding indicates that the component mounting apparatus has both of the reflection type illumination device and the transmission type illuminating device, performing operations as follows:

while using a component electronic catalog storing component text data of a plurality of components to be mounted, the component text data including shapes, dimensions, and weights of the plurality of components, selecting one of the plurality of components from the component electronic catalog;

reading out from the catalog the component text data corresponding to the selected component;

selecting one of a plurality of nozzles for sucking the selected component based on the component text data read from the catalog corresponding to the selected component; and comparing a size of a suction face of the selected nozzle with a dimension of the selected component to be sucked by the selected nozzle, wherein, if the size of the suction face of the selected nozzle is larger than the dimension of the selected component, then performing a reflection type of component recognition operation for recognizing a posture of the selected component to be sucked by the selected nozzle with respect to the selected nozzle by illuminating the selected component from below the selected component and then receiving a light reflected by a bottom surface of the selected component, wherein, if the size of the suction face of the selected nozzle is smaller than the dimension of the selected component, then performing a transmission type of component recognition operation for recognizing a posture of the selected component to be sucked by the selected nozzle with respect to the selected nozzle by illuminating the selected component from above to below the selected component and then receiving a light passed through a periphery of the selected component;

wherein, if said deciding indicates that the component mounting apparatus has only the reflection type illumination device, then performing the reflection type of component recognition operation for mounting the selected; and wherein, if said deciding indicates that the component mounting apparatus has only the transmission type illumination device, selecting a nozzle with a suction face that is smaller than the dimension of the selected component and then performing the transmission type component recognition operation.

* * * * *

UNITED STATES PATENT AND TRADEMARK OFFICE
CERTIFICATE OF CORRECTION

PATENT NO. : 7,127,459 B2 Page 1 of 1
APPLICATION NO. : 10/255953
DATED : October 24 2006
INVENTOR(S) : Takeshi Kuribayashi et al.

It is certified that error appears in the above-identified patent and that said Letters Patent is hereby corrected as shown below:

In column 26, line 27, change "selected; and" to --selected component; and--.

Signed and Sealed this

Twenty-seventh Day of February, 2007

JON W. DUDAS
*Director of the United States Patent and Trademark Office*